US006742188B1

(12) United States Patent
Del Castillo

(10) Patent No.: US 6,742,188 B1
(45) Date of Patent: May 25, 2004

(54) METHOD AND SYSTEM FOR ENCODING DATA IN THE HORIZONTAL OVERSCAN PORTION OF A VIDEO SIGNAL

(75) Inventor: Leonardo Del Castillo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/885,385

(22) Filed: Jun. 30, 1997

Related U.S. Application Data

(63) Continuation-in-part of application No. 08/795,710, filed on Feb. 4, 1997, now Pat. No. 6,415,439.

(51) Int. Cl.[7] ................................................. H04N 7/16
(52) U.S. Cl. ....................... 725/153; 725/133; 725/136; 725/141; 348/552; 348/473; 348/460; 434/393; 340/825.52; 340/825.24; 340/825.25
(58) Field of Search ................................ 725/133, 136, 725/141, 153; 348/552, 473, 460; 446/330, 408; 434/393; 340/825.52, 825.24, 825.25; 370/389, 351, 392

(56) References Cited

U.S. PATENT DOCUMENTS

| 3,493,674 | A | 2/1970 | Houghton |
| 3,743,767 | A | 7/1973 | Bitzer et al. |
| 3,891,792 | A | 6/1975 | Kimura |
| 3,900,887 | A | 8/1975 | Soga et al. |
| 3,993,861 | A | 11/1976 | Baer |
| 4,186,413 | A | 1/1980 | Mortimer |
| 4,207,704 | A | 6/1980 | Akiyama |
| 4,368,486 | A | 1/1983 | Degoulet et al. ........... 358/146 |
| 4,540,176 | A | 9/1985 | Baer |
| 4,599,644 | A | 7/1986 | Fischer |
| 4,638,359 | A | * 1/1987 | Watson |
| 4,660,033 | A | 4/1987 | Brandt |
| 4,665,431 | A | 5/1987 | Cooper |
| 4,729,563 | A | 3/1988 | Yokoi |
| 4,771,344 | A | 9/1988 | Fallacaro et al. |
| 4,807,031 | A | 2/1989 | Broughton et al. |

(List continued on next page.)

FOREIGN PATENT DOCUMENTS

| EP | 0 710 022 A2 | 5/1996 | |
| WO | WO/91/10490 | 7/1991 | |
| WO | WO 92/19073 | 10/1992 | |
| WO | WO 93/18614 | 9/1993 | ............ H04N/7/00 |
| WO | WO 93/23955 | 11/1993 | ............ H04N/7/08 |
| WO | WO 94/24820 | 10/1994 | .......... H04N/7/087 |
| WO | WO 99/00979 | 1/1999 | ............ H04N/7/08 |
| WO | WO 00/4460 | 8/2000 | |

*Primary Examiner*—Vivek Srivastava
*Assistant Examiner*—Ngoc Vu
(74) *Attorney, Agent, or Firm*—Ronald M. Anderson

(57) ABSTRACT

A method and system for encoding control data into the horizontal overscan area of a video signal. Because the control data is concatenated with the video signal on a line-by-line basis, the control data is temporarily synchronized with the underlying video signal. This permits the controlled devices, such as wireless mechanical characters, behave as characters in a scene defined by the programming information of the video signal. A protocol is defined for the encoded data that is addressable, forwardly compatible, error tolerant, and feasible to deploy in connection with a system that is primarily intended to be a children's entertainment product. The bandwidth of the communication link defined by the encoded data is adjustable to meet the cost and performance needs of a wide variety of consumers. Sufficient bandwidth is available to control several devices and to provide additional advertising, subscription, or emergency warning services, such as e-mail, foreign language subtitling, intercom capability, telephone pages, weather warnings, configuration data for a set-top box, and so forth.

51 Claims, 18 Drawing Sheets

U.S. PATENT DOCUMENTS

| | | | |
|---|---|---|---|
| 4,840,602 A | 6/1989 | Rose | |
| 4,846,693 A | 7/1989 | Baer | |
| 4,847,699 A | 7/1989 | Freeman | |
| 4,847,700 A | 7/1989 | Freeman | |
| 4,855,827 A | 8/1989 | Best | 358/143 |
| 4,862,268 A * | 8/1989 | Campbell | |
| 4,864,607 A | 9/1989 | Mitamura et al. | |
| 4,930,019 A | 5/1990 | Chu | |
| 4,949,327 A | 8/1990 | Forsse et al. | |
| 4,969,041 A | 11/1990 | O'Grady et al. | 358/142 |
| 5,021,878 A | 6/1991 | Lang | |
| 5,108,341 A | 4/1992 | DeSmet | |
| 5,198,893 A | 3/1993 | Lang | |
| 5,243,423 A | 9/1993 | DeJean et al. | 358/142 |
| 5,255,097 A | 10/1993 | Spiero et al. | 358/181 |
| 5,270,480 A | 12/1993 | Hikawa | |
| 5,371,545 A | 12/1994 | Tults | 348/465 |
| 5,398,071 A | 3/1995 | Gove et al. | 348/558 |
| 5,402,419 A * | 3/1995 | Osakabe et al. | |
| 5,450,134 A | 9/1995 | Legate | 348/467 |
| 5,453,794 A | 9/1995 | Ezaki | 348/461 |
| 5,453,795 A | 9/1995 | Tults | 348/465 |
| 5,463,423 A | 10/1995 | Tults | 348/465 |
| 5,483,289 A | 1/1996 | Urade et al. | 348/468 |
| 5,561,469 A | 10/1996 | Schultz | 348/476 |
| 5,629,738 A | 5/1997 | Kim | 348/465 |
| 5,655,945 A | 8/1997 | Jani | |
| 5,703,658 A | 12/1997 | Tsuru et al. | 348/554 |
| 5,752,880 A * | 5/1998 | Gabai et al. | |
| 5,808,689 A * | 9/1998 | Small | |
| 5,812,207 A | 9/1998 | Cahill, III | 348/465 |
| 5,977,951 A * | 11/1999 | Danieli et al. | |
| 6,005,632 A | 12/1999 | Cahill, III | 348/465 |
| 6,057,889 A | 5/2000 | Reitmeier et al. | 348/555 |
| 6,072,532 A | 6/2000 | Chieh et al. | 348/478 |
| 6,229,572 B1 | 5/2001 | Ciardullo et al. | 348/473 |
| 6,281,939 B1 | 8/2001 | Del Castillo et al. | 348/558 |
| 6,377,308 B1 | 4/2002 | Cahill, III | 348/461 |
| 6,415,439 B1 | 7/2002 | Randell et al. | 725/153 |

* cited by examiner

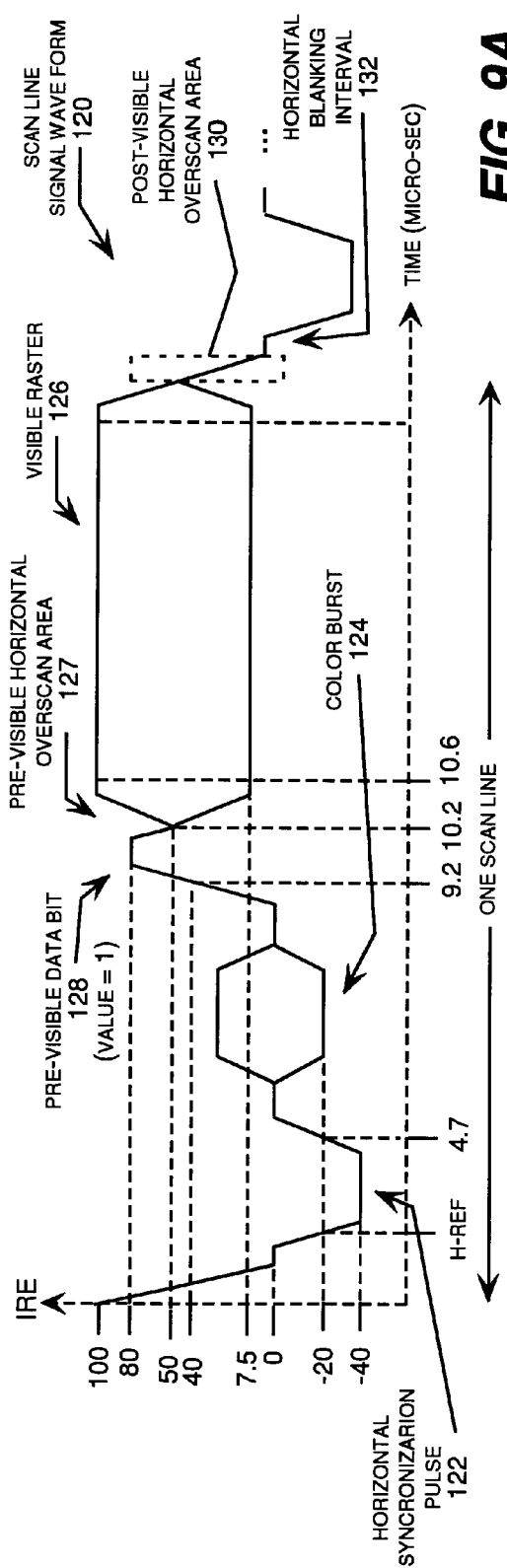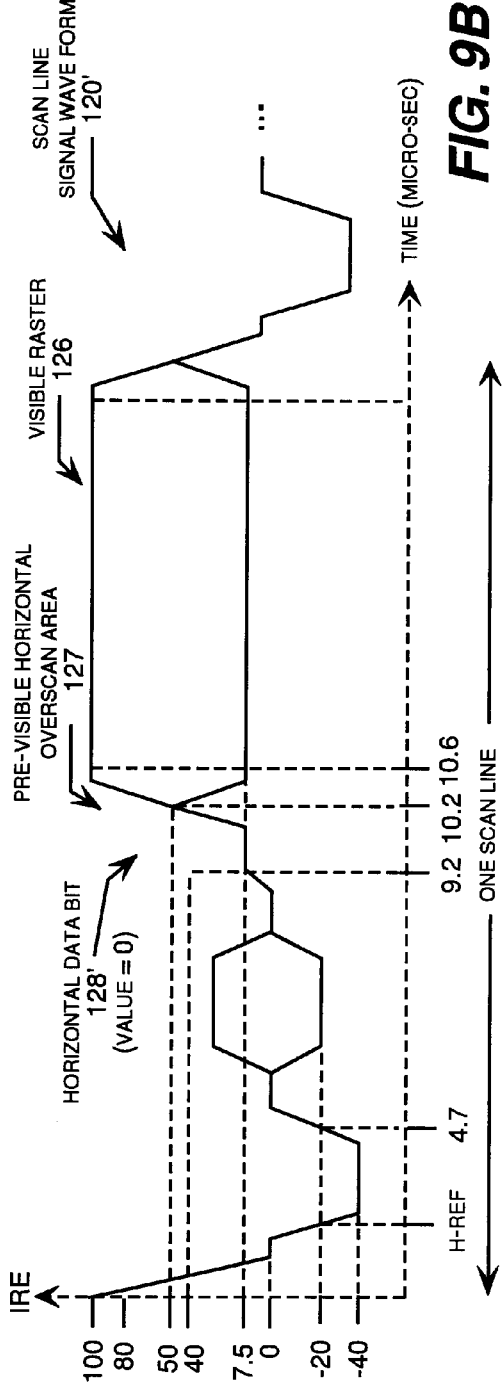

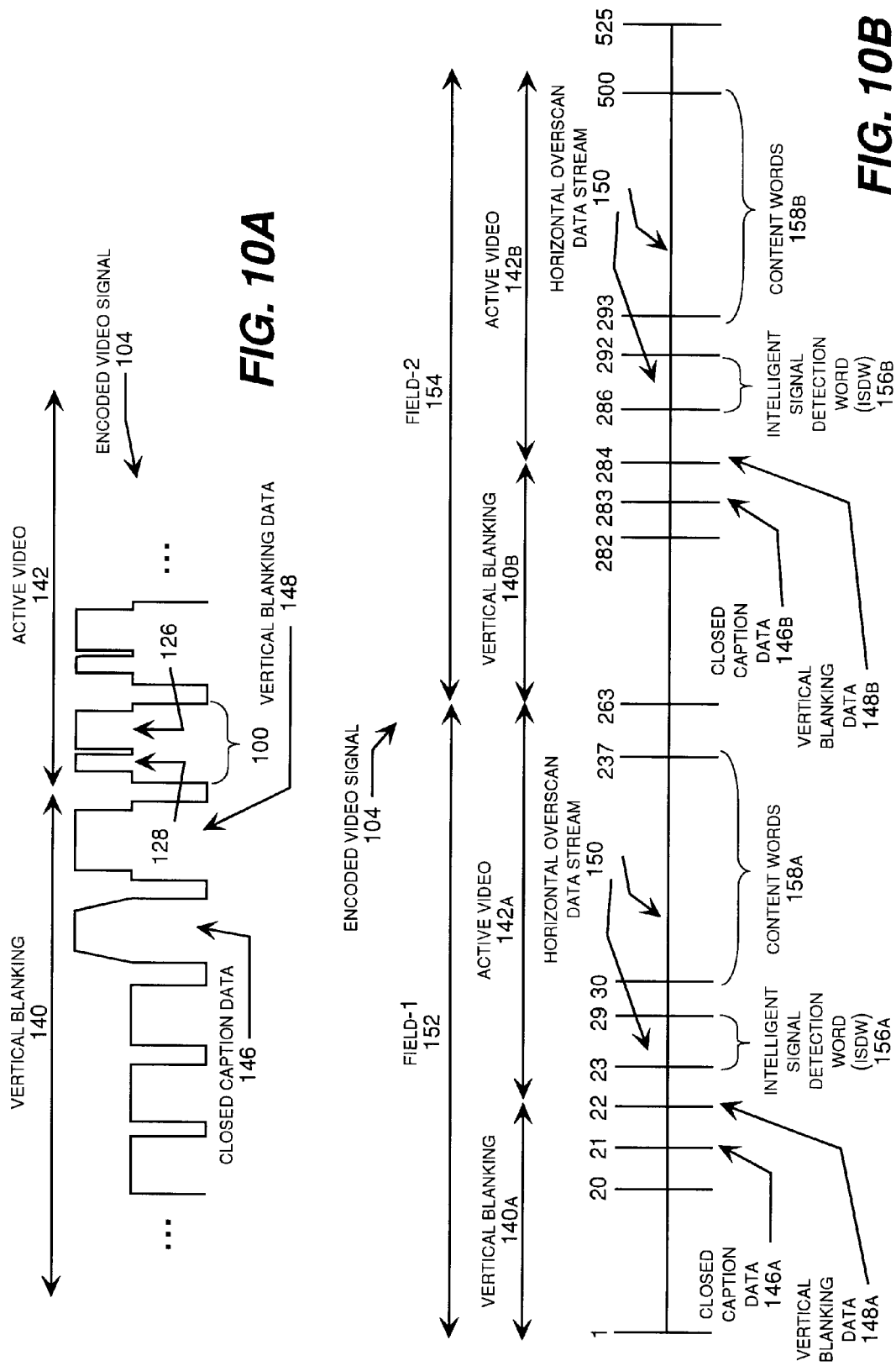

METHOD AND SYSTEM FOR ENCODING DATA IN THE HORIZONTAL OVERSCAN PORTION OF A VIDEO SIGNAL

REFERENCE TO RELATED APPLICATIONS

This application is a continuation-in-part of U.S. application Ser. No. 08/795,710 entitled "PROTOCOL FOR A WIRELESS CONTROL SYSTEM" filed on Feb. 4, 1997 now U.S. Pat. No. 6,415,439, which is assigned to a common assignee.

TECHNICAL FIELD

The present invention relates to wireless communication systems and, more particularly, relates to encoding data in the horizontal overscan portion of a video signal.

BACKGROUND OF THE INVENTION

A variety of consumer products available today rely upon the use of wireless communication. Examples include cordless phones, garage door openers, remotely controlled appliances, and remotely controlled toys. A common motivation that drives manufacturers of these and similar products is minimizing the cost associated with providing the wireless communication capability. Thus, techniques for minimizing the cost of radio equipment for transmitting and receiving radio frequency signals while maintaining reliable communication are continuously explored.

Interactive toys, games, and learning products for the home could be particularly useful applications of wireless communication technology. Wireless systems eliminate the use of wire-line communication links and, therefore, are preferable for many household applications. For example, wireless toys, games, and learning products eliminate wires that small children might tangle or pull free, or that dogs might chew. Wireless products also avoid the need for universal plugs or adapters and allow a large number of wireless devices to be controlled by a single controller without requiring a large terminal port for plugging-in the controlled devices. Wireless communication links are therefore safer, more robust, more versatile, and in many cases less expensive than wire-line communication links.

There are a number of often competing objectives in designing wireless products, such as toys, games, and learning products, for use in a home environment. First, the entire system should be priced within an acceptable range for a children's entertainment product. Furthermore, because each child may desire new controlled devices over time, the cost of each controlled device should be as low as possible. This means that the controlled devices should include inexpensive wireless communication equipment, such as conventional amplitude modulation (AM) radio equipment and digital data handling equipment.

Second, it is advantageous for several wireless devices to be controlled simultaneously by a single controller. In the context of a wireless toy environment, this allows several children to interact with their own toys at the same time. For example, one child may interact with a "FRED" toy, while another interacts with a "WILMA" toy, while yet another interacts with a "DINO" toy, etc. In addition, it is advantageous for a variety of different toys to be available so that children have a selection of toys to choose from and collect. Moreover, in a progressive learning system, it is advantageous to have a series of toys associated with different skills so that a child can progress through the skills learned by interacting with the different toys.

Third, it is advantageous for the controller and the controlled devices to be operable for engaging in bidirectional communications. This is particularly useful in an interactive learning environment in which a child interacts with a controlled device. For example, the controller may direct a controlled doll to say, "Please squeeze my left hand." The controlled doll may then transmit the child's response back to the controller, which responds accordingly. For example, if the child squeezes the doll's right hand, the controller directs the doll to say, "No that's my right hand, please squeeze my left hand."

A fourth consideration is forward compatibility. This means that the original controller can be used to operate future versions of controlled devices. For example, an interactive toy product may initially be introduced with only one or two controlled devices (e.g., "FRED" and "WILMA"). But over the next several years, dozens of new controlled products may be released to upgrade the system (e.g., "DINO," "BAM-BAM," etc.). Forward compatibility allows the new controlled devices to be operated by the original controller.

In addition, control data must be provided to the controller, which in turn transmits the control data to the controlled devices through a local wireless communication link. Although the control data may be generated locally, for example by a computer located in close proximity to the controller, it is also desirable to transmit the control data from a remote location using a broadcast-level communication link, such as an air-wave or cable television signal. In particular, it would be advantageous to broadcast the control data along with a standard video signal for driving a display device, such as a television or monitor. In this manner, the controlled devices may be caused to operate in synchronism with the programming information defined by the video signal. For example, a controlled device may operate as a character in a video program displayed on the television or monitor.

In order to effectively broadcast the control data in connection with a video signal, several often competing objectives should be attained. First, as noted above, the control data should be temporarily synchronized with the video signal so that the actions of the controlled devices operate in synchronism with the programming information displayed on the television or monitor. Second, the control data should be easily concatenated with a standard video signal for transmission in a variety of broadcast media using standard equipment. Third, the control data should not interfere with the video signal or visibly disrupt the display of the video signal. Fourth, sufficient bandwidth should be provided in the upstream communication link (e.g., a broadcast-level communication link) to fully satisfy the bandwidth requirements of the downstream communication link (e.g., local wireless communication link). In addition, it would be advantageous for additional bandwidth to be available in the upstream communication link for transmitting additional information for other data sinks to provide advertising, subscription, or emergency warning services, such as e-mail, foreign language subtitling, telephone pages, weather warnings, configuration data for a set-top box, and so forth. It would also be advantageous for the bandwidth of the upstream communication link to be adjustable to meet the cost and performance needs of a wide variety of consumers.

As with the downstream wireless communication link, the protocol for the upstream communication link should be addressable so that several wireless controlled devices, as well as other data sinks, may be controlled simultaneously.

The protocol should also be error tolerant and accommodate forward compatibility for future wireless controlled devices and other services that may be provided through the broadcast media. All of these attributes should be implemented at a-cost that is feasible to deploy in connection with a system that is primarily intended to be a children's entertainment product.

There is, therefore, a need for a method and system for encoding control data for wireless controlled devices in connection with a video signal so that the actions of the controlled devices operate in synchronism with the programming information defined by the video signal. There is a further need for a method and system for encoding additional data in connection with the video signal for providing services, such as e-mail, intercom capability, foreign language subtitling, telephone pages, weather warnings, configuration data for a set-top box, and so forth. There is a further need for a protocol for encoding data in connection with a video signal that is be addressable, forwardly compatible, error tolerant, and feasible to deploy in connection with a system that is primarily intended to be a children's entertainment product.

SUMMARY OF THE INVENTION

The present invention meets the needs described above by providing a method and system for encoding control data in the horizontal overscan portion of a video signal. Because the control data is concatenated with the video signal on a line-by-line basis, the control data is temporarily synchronized with the underlying video signal. This permits the controlled devices, such as wireless mechanical characters, to behave as characters in a scene defined by the programming information of the video signal. A protocol is defined for the encoded data that is addressable, forwardly compatible, error tolerant, and feasible to deploy in connection with a system that is primarily intended to be a children's entertainment product. The bandwidth of the communication link defined by the encoded data is adjustable to meet the cost and performance needs of a wide variety of consumers. Sufficient bandwidth is available to control several devices and to provide additional advertising, subscription, or emergency warning services, such as e-mail, foreign language subtitling, intercom capability, telephone pages, weather warnings, configuration data for a set-top box, and so forth.

Generally described, the invention provides a method for encoding control data in a video signal that includes a series of frames that each include a number of lines. The encoded data is concatenated with the lines of the video signal to create an encoded video signal, which is configured to define content data in association with each frame. The content data is configured to define a first address associated with a first device, device-specific control data for the first device, a second address associated with a second device, and device-specific control data for the second device. In response to the first address, the device-specific control data for the first device is routed to the first device and the actions of the first device are controlled accordingly. Similarly, in response to the second address, the device-specific control data for the second device is routed to the second device and the actions the second device are controlled accordingly.

The video signal typically defines programming information including a scene displayed on a display device. The device-specific control data for the first device typically includes voice and motor control data that causes the first device to behave as a character in the scene displayed on the display device. The device-specific control data for the second device may be voice or motor control data that causes the second device to behave as a second character in the scene displayed on the display device, electronic mail for a transmission to a computer system, intercom information for transmission to an intercom system, telephone paging information for transmission to a paging system, or language translation information, advertising information, subscription information, or emergency warning information displayed on the display device. Many other specific applications will be apparent to those skilled in the art.

The addressing scheme for the device-specific control data implements a versatile and extensible packet-based data transmission format. For example, the first address may be a first start-packet short address word for a first controlled device, and the second address may be a second start-packet short address word for a second controlled device. In this case, the second start-packet short address word may be interpreted as an end-packet short address word for the first controlled device.

In addition, the first address may define a start-packet begin-long-address word. In this case, the content data also defines a first occurrence of a long address associated with the first device, and a start-packet end-long-address word associated with the first device, device-specific control data for the first device.

According to an aspect of the invention, the encoded data may include signal detection words and content words. Each signal detection word and each content word may include data bits and error correction bits that are used to correct errors in the data bits. Specifically, the error correction bits may define a correction sequence that allows a single-bit error in the data bits to be detected and corrected. Each signal detection word may include four data bits and three error correction bits, and each content word may include nine data bits and seven error correction bits.

According to another aspect of the invention, a signal detection word may be encoded into each frame of the video signal such that a consecutive series of the signal detection words defines a dynamic validation sequence. For this sequence, each signal detection word varies in at least two bits from the immediately preceding signal detection word. For example, the dynamic validation sequence transmitted in consecutive fields of a two-field interlaced frame of the video signal may include the binary representation of 8, 1, 10, 3, 12, 5, 14, 7.

According to yet another aspect of the invention, the encoded data is defined by line signals located in the horizontal overscan portion of a video signal. Specifically, each line signal may be a pre-visible pulse located between the color burst portion and the visible raster portion of a horizontal scan line of the video signal. Each pulse may define a single bit of the encoded data, in which case the encoded data of each field of a two-field interlaced frame of the video signal may define one 7-bit signal detection word and 13 16-bit content words. To increase the bandwidth of the encoded data transmission, each line signal may include both a pre-visible pulse and a post-visible pulse located after the visible raster portion and before the horizontal blanking interval. To further increase the bandwidth of the encoded data transmission, each pulse may be modulated to define several bits.

The invention also provides an encoded video signal, which is created according to the method described above, and a system for creating and using the encoded video signal. The system includes a video data encoder that is functionally connected to a video source that provides a video signal, such as an NTSC television signal. The video data encoder receives the video signal, which includes a series of frames that each include a number of lines. The video data encoder concatenates encoded data with the lines of the video signal to create the encoded video signal.

The video data encoder is functionally connected to data decoder that receives the encoded video signal from the video data encoder. The data decoder detects the presence of the signal detection data, extracts the content data from the encoded video signal, and assembles the content data into a serial data communication signal. The data decoder is functionally connected to a data error processor that receives the serial data communication signal from the data decoder. The data error processor parses the serial data communication signal into data bits and error corrections bits, analyzes the error correction bits to detect errors in the data bits, corrects detected errors in the data bits, and assembles the corrected data bits into an error corrected data stream.

The data error processor is functionally connected to a protocol handler that receives the error corrected data stream from the data error processor. The protocol handler detects a first start-packet short address word associated with a first device and, in response, begins the routing of subsequently received device-specific control data to the first device. The protocol handler also detects a second start-packet short address word associated with the second device and, in response, begins the routing of subsequently received device-specific control data to the second device. The protocol handler also interprets the second start-packet short address word as a first end-packet short address word associated with the first device and, in response, discontinues the routing of subsequently received device-specific control data to the first device.

The protocol handler also detects a start-packet start-long-address word, detects a long address associated with a third device, detects a start-packet end-long-address word, and begins the routing of subsequently received device-specific control data to the third device. To end the transmission to the third device, the protocol handler detects a further address word and, in response, discontinues the routing of subsequently received device-specific control data to the third device.

That the invention improves over the drawbacks of the prior art and accomplishes these advantages will become apparent from the following detailed description of the exemplary embodiments and the appended drawings and claims.

BRIEF DESCRIPTION OF THE DRAWINGS

FIG. 9A is a wave form diagram illustrating a data bit value "one" encoded in the horizontal overscan portion of a scan line of an encoded video signal.

FIG. 9B is a wave form diagram illustrating a data bit value "zero" encoded in the horizontal overscan portion of a scan line of an encoded video signal.

FIG. 10A is a diagram illustrating the location of data bits in a portion of a frame of an encoded video signal.

FIG. 10B is a diagram illustrating the location of data bits in two interlaced fields of a frame of an encoded video signal.

DETAILED DESCRIPTION

Figure 1:
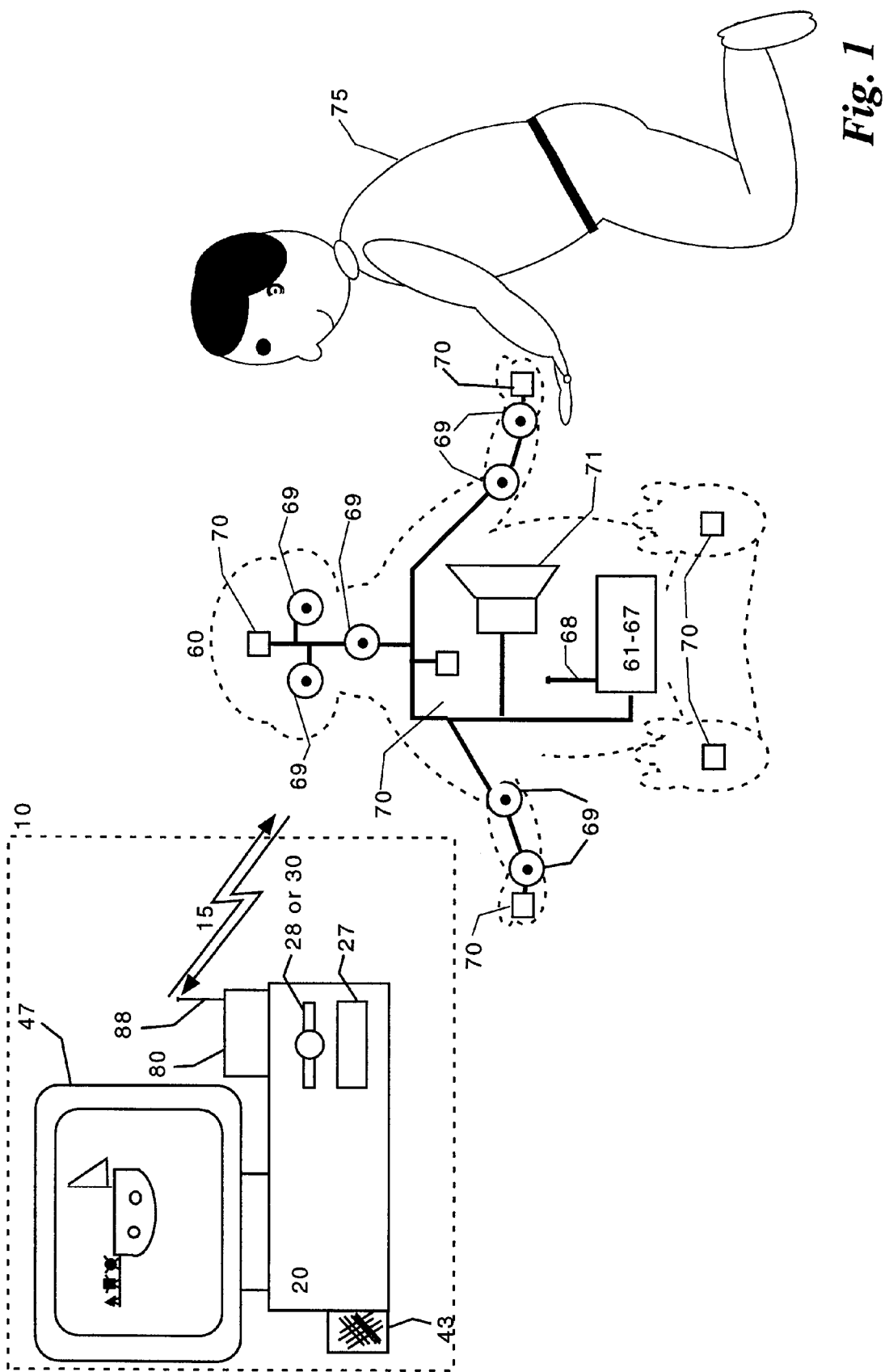
FIG. 1 is a block diagram of a duplex wireless control environment including a controller and a controlled device.

An exemplary embodiment of the invention is a system for encoding control data into the horizontal overscan area of a video signal. Because the control data is concatenated with the video signal on a line-by-line basis, the control data is temporarily synchronized with the underlying video signal. This permits the controlled devices, such as wireless mechanical characters, behave as characters in a scene defined by the programming information of the video signal. The protocol for the encoded control data is addressable, forwardly compatible, error tolerant, and feasible to deploy in connection with a system that is primarily intended to be a children's entertainment product. The bandwidth of the communication link defined by the encoded data is adjustable to meet the cost and performance needs of a wide variety of consumers. Sufficient bandwidth is available to control several mechanical characters and to provide additional advertising, subscription, or emergency warning services, such as e-mail, foreign language subtitling, telephone pages, intercom capability, weather warnings, configuration data for a set-top box, and so forth.

Exemplary Embodiment: The "REALMATION" System

The present invention may be deployed in a wireless communication environment that includes a controller (also referred to as a master device) that communicates with and controls one or more controlled devices (also referred to as slave devices) on a single radio-frequency (RF) communication channel. A specific embodiment of the invention is known as the "REALMATION" system. "REALMATION," derived from combining the words "realistic" and "animation," is descriptive of a new technology developed by Microsoft Corporation of Redmond Wash. A controller in a typical "REALMATION" system includes a computer system with a display device and a wireless modem that communicates with and controls one or more controlled devices, such as animated mechanical characters. The controller drives a display device to depict programming information, such as scenes of an audio/video presentation, while simultaneously transmitting control data, including voice coefficients and motion vectors, to one or more mechanical characters. The mechanical characters, in response to receiving the control data, move and talk as characters in the scenes depicted on the display device.

Microsoft Corporation is developing a "REALMATION" product line that includes two main components: a controller (i.e., master device) known as the "REALMATION CONTROLLER," and one or more controlled devices (i.e., slave devices) known as "REALMATION PERFORMERS." A controlled device may be specially designed for a specific industrial, educational, research, entertainment, or other purpose. For example, a controlled device such as the "BARNEY" dinosaur character is specially designed for a learning and entertainment system for small children. Each controlled device includes an RF receiver system for receiving, demodulating, and decoding signals transmitted by the controller. The signals transmitted by the controller contain control data, such as speech coefficients and motion vectors. The control data causes the controlled device to behave as a character in a scene depicted on a display device driven by the controller.

In a duplex environment, each controlled device may also include an RF transmitter system for encoding, modulating, and transmitting response signals back to the controller. These response signals may include test or receptor data defining status information concerning the controlled device. For example, a controlled device may include pressure or light sensitive receptors for receiving user input, such as squeezing or covering a part of the character. This is particularly useful in an interactive learning environment in which a child interacts with the controlled device. For example, the controller may direct a "BARNEY" controlled device to say, "Please squeeze my left hand." The controlled device may then transmit the child's response back to the controller, which responds accordingly. For example, if the child squeezes the controlled device's right hand, the controller may direct the controlled device to say, "No, that's my right hand, please squeeze my left hand."

The controller includes a data source that receives or generates video data and related control data so that one or more controlled devices may behave as characters in a scene depicted on a display device. To do so, the control system includes a wireless modem (or wireless modulator for a simplex environment), known as the "REALMATION LINK MASTER," and a display device, such as a television or a computer monitor. The data source may be an active device, such as computer system or an interactive television system, that generates the video data and related control data in real-time. Alternatively, the data source may be a passive device, such as a cable system, VCR, or television broadcast signal, that feeds a previously-created data stream including video data and encoded control data to the wireless modem. In this case, the wireless modem extracts the control data from the data stream, feeds the video data to the display device, and broadcasts the control data to one or more controlled devices.

In addition, the controller may be an intelligent system that is operative to generate, select, and combine video and control data from a number of sources in response to user input or other control signals. Regardless of the configuration, some type of data source provides a data stream including video and related control data, and the wireless modem extracts the control data from the video data, routes the video data to the display device, and broadcasts the control data to one or more controlled devices. To broadcast control data, the wireless modem encodes the control data into a special differential-pulse data modulation (DDM) format and transmits the DDM-encoded control data to the controlled devices. In addition, the wireless modem may receive DDM-encoded response signals from the controlled devices and decode the response signals.

The "REALMATION" product line may operate in a simplex environment or in a duplex environment. The operation of exemplary embodiments of the controller, the wireless modem (or modulator), and the controlled devices in these environments will be described in the context of programs running on microprocessor-based computer systems. Those skilled in the art will recognize that implementations of the present invention may include various types of program modules, use various programming languages, and be operable with various types of computing equipment. Additionally, although the descriptions of exemplary embodiments describe the controller as communicating with a controlled device over an RF communication channel, those skilled in the art will appreciate that substitutions to the RF communication channel can include other communication mediums such as fiber optic links, copper wires, infrared signals, etc.

Generally, a program, as defined herein, includes routines, subroutines, program modules, components, data structures, etc., that perform particular tasks or implement particular abstract data types. Moreover, those skilled in the art will appreciate that aspects of the present invention are applicable to other computer system configurations. These other computer system configurations include but are not limited to hand-held devices, multiprocessor systems, microprocessor-based or programmable consumer electronics, minicomputers, mainframe computers, and the like. Aspects of the present invention are also applicable within the context of a distributed computing environment, such as the Internet, in which tasks may be performed by remote processing devices that are linked through a communications network. In a distributed computing environment, program modules may be located in both local and remote memory storage devices.

In both the simplex and duplex environments, the controlled devices may be low-cost, animated, mechanical characters intended for use in an interactive learning and entertainment environment for children. At minimum, each controlled device includes a receiver system, a speech synthesizer, a speaker, a processor, and one or more servo motors. But a controlled device may include many other types of end effectors, such as light sources, heat source, inflatable devices, pumps, and so forth. Indeed, the protocol for the wireless control system is designed to be forwardly compatible with a wide range of controlled devices that may be developed in the future. In response to the receiver system receiving control data on a predefined RF channel, the processor decodes, interprets, and responds in a manner dictated by the contents of the control data. The response of the processor may include actuating one or more servo motors, providing input to the speech synthesizer, or activating any of the other end effectors provided in a particular controlled device.

In the duplex environment, the controlled devices may also include one or more sensor devices and a transmitter system. The sensor devices typically detect actions such as a child squeezing the hand, covering the eyes, or changing the position of the controlled device. By monitoring output signals from the sensors, the processor collects status information. Upon receiving a request from the controller, the processor transmits this sensor status information to the controller. In response to receiving the sensor status information, the controller may alter the animated audio/video presentation in a manner commensurate with the information. For example, in response to the action of a child covering the eyes of the controlled device, the audio/video presentation may switch to a game of peek-a-boo.

Thus, in the duplex environment, the controller engages in bidirectional communication with one or more controlled devices. Although the description of the duplex environment of the controller describes a program running on a personal computer and cooperating with another program running on a microprocessor-based communication device, those skilled in the art will recognize that other implementations, such as a single program running on a stand-alone platform, a distributed computing device equipped with radio communication equipment, or an interactive television system, may also suffice.

In the simplex environment, the controller engages in unidirectional communication with one or more controlled device. Although the description of the simplex environment of the controller describes a video cassette recorder (VCR) or a cable television box interfacing with a program running on a microprocessor-based communication device, those skilled in the art will recognize that other implementations, such as direct broadcasting signals, laser disc players, video tape players, computing devices accessing CD-ROM's, etc., may also suffice. In addition, the simplex environment may include integrating a VCR or similar device with a microprocessor-based communication device for operating in a stand-alone configuration.

The detailed description that follows is represented largely in terms of processes and symbolic representations of operations by conventional computer components, including a microprocessor unit (MPU), memory storage devices for the MPU, display devices, output control signals, and input devices. Furthermore, these processes and operations may utilize conventional computer components in a heterogeneous distributed computing environment, including remote file servers, remote computer servers, and remote memory storage devices. Each of these conventional distributed computing components is accessible by the MPU through a communications network.

The processes and operations performed by the computer include the manipulation of signals by a MPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, flags, variables, parameters, objects, properties, tags, types, identifiers, values, elements, symbols, characters, terms, numbers, points, records, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, replying, etc., which are often associated with manual operations performed by a human operator. The operations described herein are machine operations performed in conjunction with various inputs provided by a human operator or user that interacts with the computer.

In addition, those skilled in the art will understand that the programs, processes, methods, etc., described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein. The specialized apparatus could consist of dedicated computer systems in a specific network architecture with hard-wired logic or programs stored in nonvolatile memory, such as read only memory, magnetic storage devices, or optical storage devices.

The communication between the master and slave devices will be described in the context of RF signal transmissions formed in accordance with amplitude modulation (AM) techniques. The RF signals are used to transfer symbolic representations of digital information from one device to another. The RF signals are generated by modulating the amplitude of a carrier signal in a predetermined manner based on the value of a symbolic representation of the digital data. Those skilled in the art will understand that a variety of communication technologies may be utilized for transmitting the information between these devices and that describing the use of AM techniques should not restrict the principles of any aspect of the present invention.

Referring now to the drawings, in which like numerals represent like elements throughout the several figures, aspects of the present invention and exemplary operating environments will be described. Reference is made to FIGS. 1–7 below to provide a description of suitable environments in which the invention may be implemented. Reference is then made to FIGS. 8–14 to describe the preferred wireless communication protocol for controllers and controlled devices in these environments.

Duplex Environment

FIG. 1 illustrates an exemplary duplex environment for embodiments of the present invention. This duplex environment may be operated as an interactive learning and entertainment system for a child. The duplex environment includes a controller 10 that controls and interacts with a controlled device 60. The controller 10 includes a conventional personal computer 20, a wireless modem 80, an antenna 88, a speaker 43, and a display device 47. The personal computer 20 may include a hard disk drive 27, a magnetic disk drive 28, and/or an optical disk drive 30.

During operation, the controller 10 drives an audio/video presentation on the display device 47 and the speaker 43. In addition, the controller 10 transmits message packets that may include control data to the controlled device 60. The control data typically includes voice synthesis coefficients and motor vectors for controlling the operation of the controlled device 60. The process of transmitting the control data includes building a data stream using the proper protocol, modulating a carrier with the data stream, and emitting the modulated carrier as an RF signal from the antenna 88 over the RF communication channel 15. More specifically, the controller 10 includes a multimedia personal computer system 20 and a wireless modem 80. The computer system 20 passes the control data to the wireless modem 80 through a wired connection between the wireless modem 80 and the game (MIDI) port of the computer system 20. The wireless modem 80 then builds the data stream using the proper protocol, modulates a carrier with the data stream, and emits the modulated carrier over the RF communication channel 15.

The controlled device 60 receives the RF signals from the controller at the antenna 68. The receiver system 61–67 processes the received RF signals to recover the control data. The controlled device 60 interprets the received control data and responds to the control data by controlling the operation of one or more servo motors 69 or other end effectors within the controlled device 60, which includes providing speech data to be audibly presented by the speaker 71. Thus, transmitting the appropriate control data to the controlled device 60 causes the controlled device 60 to move and talk as though it is a character in the audio/video presentation.

The controlled device 60 also includes light sensors and touch sensors 70. In response to a child touching, squeezing, or moving the controlled device 60 in an appropriate manner, the light sensors and/or touch sensors 70 within the controlled device 60 generate status information. In response to a command from the controller 10, the controlled device 60 transmits the status information over the RF communication channel 15 back to the wireless modem 80 for processing by the controller 10. In response to receiving and interpreting the status information, the controller 10 may alter the progression of the audio/video presentation in a manner commensurate with the status information.

Figure 2:
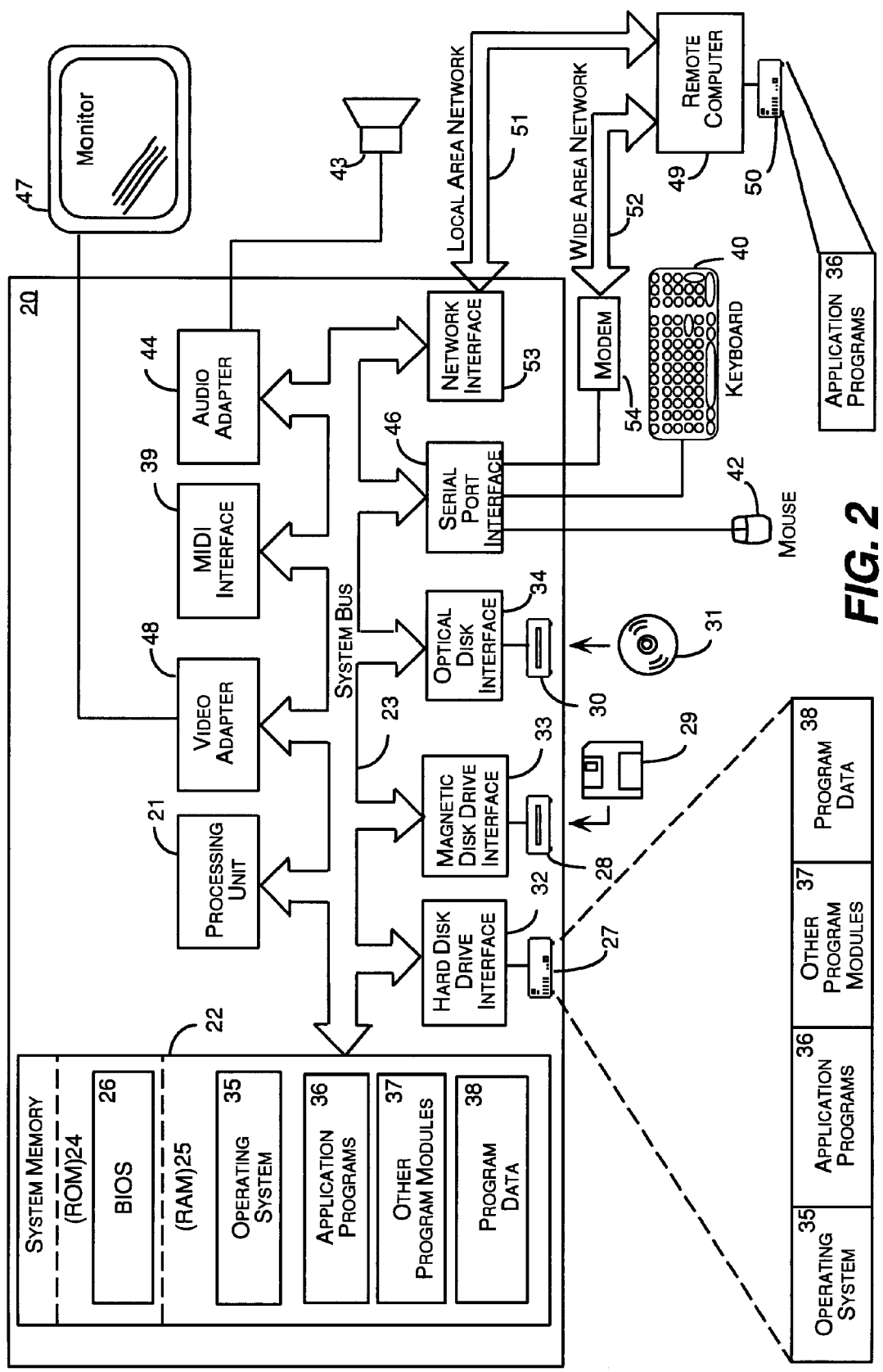
FIG. 2 is a block diagram of the personal computer that forms a part of the controller of FIG. 1.

FIG. 2 illustrates an exemplary computer system for implementing the controller 10 in the duplex environment illustrated in FIG. 1. The exemplary computer system includes a conventional personal computer 20, including a processor 21, a system memory 22, and a system bus 23 that couples the system memory to the processor 21. The system memory 22 includes a read only memory (ROM) 24 and a random access memory (RAM) 25. The ROM 24 provides storage for a basic input/output system 26 (BIOS), containing the basic routines that help to transfer information between elements within the personal computer 20, such as during start-up. The personal computer 20 further includes a hard disk drive 27, a magnetic disk drive 28 for reading from or writing to a removable disk 29, and an optical disk drive 30 for reading a CD-ROM disk 31 or for reading from or writing to other optical media. The hard disk drive 27, the magnetic disk drive 28, and the optical disk drive 30 interface to the system bus 23 through a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk, and a CD-ROM disk, those skilled in the art will understand that other types of media that are readable by a computer, such as magnetic cassettes, flash memory cards, digital video disks, Bernoulli cartridges, and the like, may also be used in the exemplary operating environment.

A number of program modules may be stored in the drives 27–30 and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, a joystick, a track ball, a light pen, a game pad, a scanner, a camera, or the like. These and other input devices are often connected to the processor 21 through a serial port interface 46 that is coupled to the system bus, but may be connected by other interfaces, such as a game port or a universal serial bus (USB). A computer monitor 47 or other type of display device is also connected to the system bus 23 via an interface, such as a video adapter 48. One or more speakers 43 are connected to the system bus via an interface, such as an audio adapter 44. In addition to the monitor and speakers, personal computers typically include other peripheral output devices (not shown), such a printers and plotters.

The personal computer 20 may operate in a networked environment using logical connections to one or more remote computers, such as a remote computer 49. Although only a memory storage device 50 has been illustrated in FIG. 2, the remote computer 49 may be a server, a router, a peer device, or other common network node, and typically includes many or all of the elements described relative to the personal computer 20. The logical connections depicted in FIG. 2 include a local area network (LAN) 51 and a wide area network (WAN) 52. These types of networking environments are commonplace in offices, enterprise-wide computer networks, intranets, and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules that may be accessed by the personal computer 20, or portions thereof, may be stored in the remote memory storage device. The network connections shown are exemplary and other means of establishing communications links among the computers may be used.

The personal computer 20 contains a musical instrument digital interface (MIDI) adapter 39, which allows the MPU 21 to control a variety of MIDI compatible devices (e.g., electronic keyboards, synthesizers, etc.) The MIDI adapter may also allow the MPU 21 to control a wireless modem 80. The MIDI adapter operates by receiving data over the system bus 23, formatting the data in accordance with the MIDI protocol, and transmitting the data over a MIDI bus 45. The equipment attached to the MIDI bus detects the transmission of the MIDI formatted data and determines whether the data is to be accepted and processed or ignored. That is, the wireless modem 80 examines the data on the MIDI bus and only processes data that explicitly identifies the wireless modem 80 as the intended recipient. In response to receiving data, the wireless modem 80 may transmit the data, such as control data intended for one or more controlled devices, over the RF communication channel 15.

Figure 3:
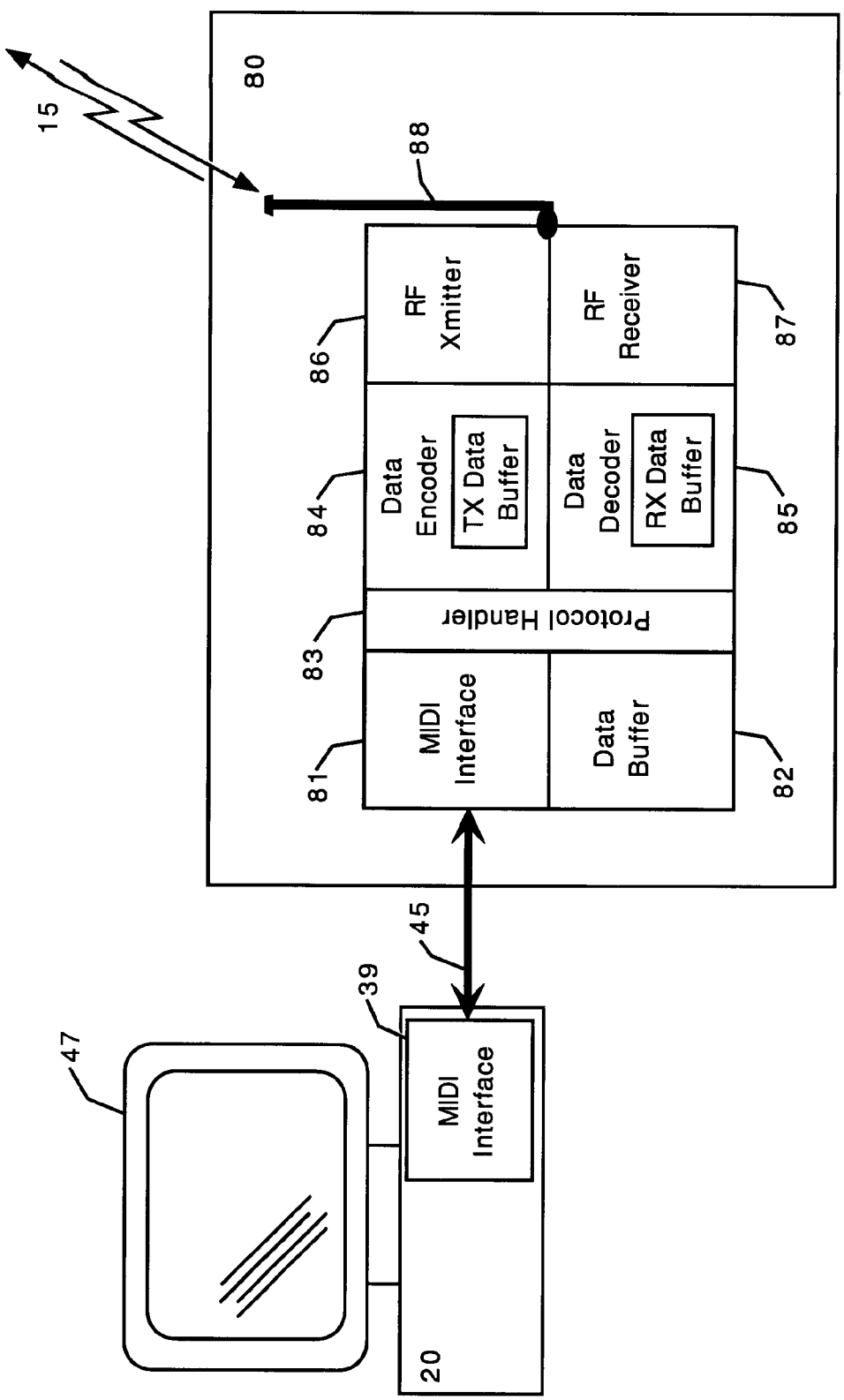
FIG. 3 is a block diagram of a wireless modem that forms a part of the controller of FIG. 1.

FIG. 3 is a block diagram illustrating the various components that define the wireless modem 80. Initially, a program running on the computer 20 obtains control data by generating the data or retrieving the data from a storage media accessible to the computer 20. In addition, the program may format the control data in accordance with a predefined protocol, such as a specific "REALMATION" protocol. Or in the alternative, the program may retrieve preformatted control data from a storage media. The program transfers the control data to the wireless modem 80 over the MIDI interface including the MIDI adapters 39 and 81 and the MIDI bus 45. This process includes repackaging the control data into the MIDI format. Those skilled in the art will appreciate that the MIDI interface is only one of several possible interfaces that can be used to transfer control data between the computer 20 and the wireless modem 80. Alternative interfaces include, but are not limited to, interfaces such as RS232, Centronix, and SCSI.

The protocol handler 83 receives the MIDI formatted data from the MIDI adapter 81 and removes the MIDI formatting to recover the control data. During this process, the protocol handler 83 may temporarily store the control data and or the MIDI formatted data in the data buffer 82. The protocol handler 83 may also perform other manipulations on the control data in preparation for transmitting the data. Before transmitting the control data, the data encoder 84 encodes the control data and provides the encoded control data to the RF transmitter 86. The RF transmitter uses the encoded control data to modulate a carrier and then transmits the modulated carrier over the RF communications channel 15 from the antenna 88.

The wireless modem 80 may also receive signals carrying response data originating from one or more controlled devices 60 or other devices. The wireless modem 80 detects these signals at the antenna 88 and provides the signals to the RF receiver 87. The RF receiver 87 demodulates the received signals, recovers the encoded response data, and provides the encoded response data to the data decoder 85. The data decoder 85 decodes the encoded response data and provides the decoded response data to the protocol handler 83. The protocol handler 83 formats the decoded response data into the MIDI format and transfers the MIDI formatted data to the computer 20 through the MIDI interface 81. The protocol handler 83 and or the MIDI interface 81 may temporarily store the response data in the data buffer 82 during processing. Upon receiving the information at the MIDI Interface 39, the computer 20 recovers the response data from the MIDI formatted data and then processes the response data.

Simplex Environment

Figure 4:
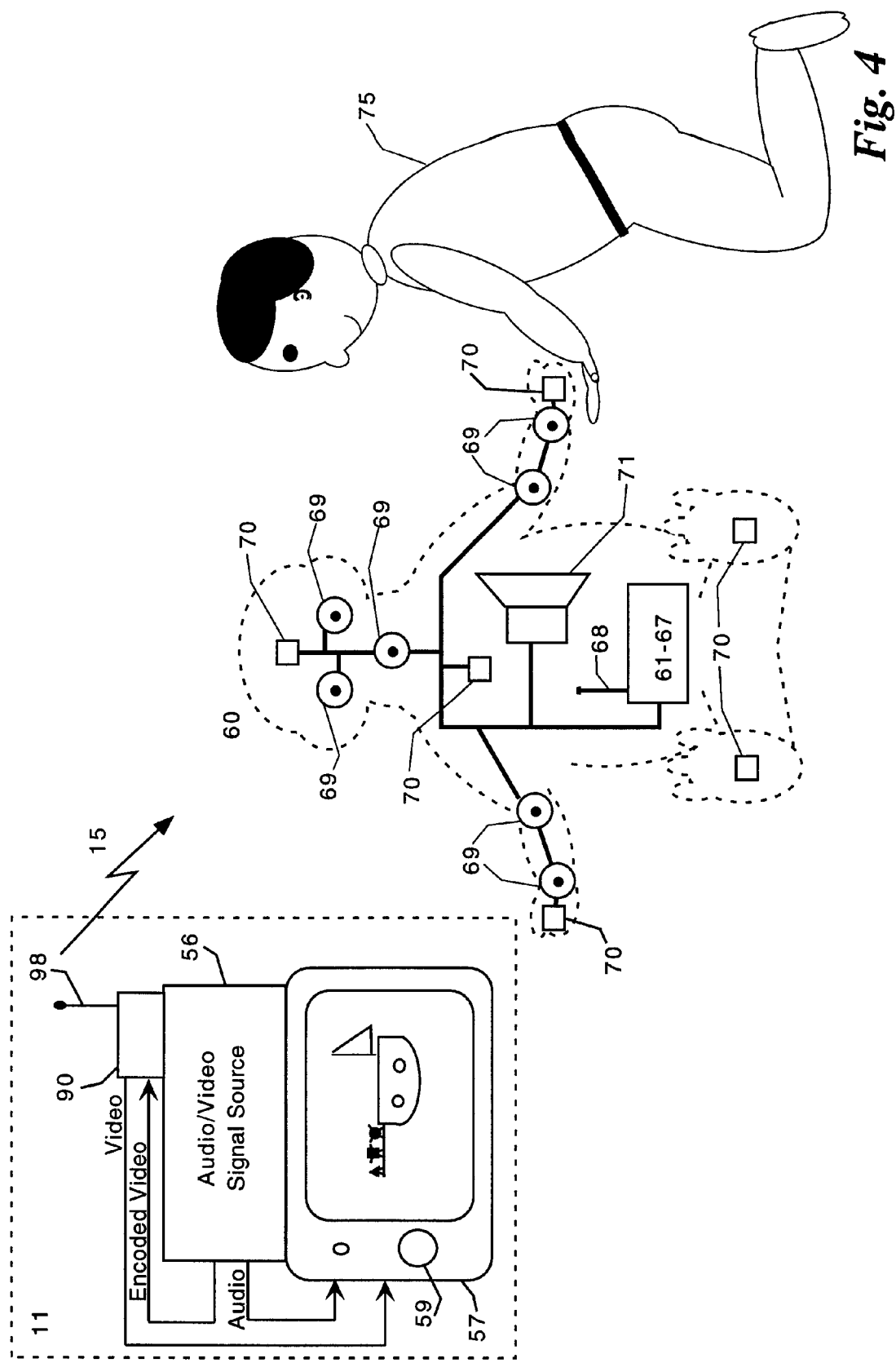
FIG. 4 is a block diagram of a simplex wireless control environment including a controller and a controlled device.

FIG. 4 illustrates an exemplary simplex environment for embodiments of the present invention. This simplex environment may be operated as a learning and entertainment system for a child. The simplex environment includes a controller 11 that controls a controlled device 60. The controller 11 includes an audio/video signal source 56, a wireless modulator 90, an antenna 98, and a display device 57 including a speaker 59. The controller 11 transmits control data to the controlled device 60 via an antenna 98 and an RF communication channel 15. To accomplish this task, the wireless modulator 90 interfaces with the audio/video signal source 56 and the display device 57 through a standard video interface. Over this standard video interface, the wireless modulator 90 receives a video signal encoded with control data (encoded video) from the audio/video signal source 56. The wireless modulator 90 extracts the control data from the encoded video signal, and then transfers the control data to a controlled device 60 through the RF communication channel 15.

In addition, the wireless modulator 90 passes the video signal to the display device 57. The audio/video signal source 56 also interfaces with the speaker 59 in the display device 57. Over this interface, the audio/video signal source 56 provides audio for an audio/video presentation. Thus, a child can observe the audio/video presentation on the display device 57 and the speaker 59 while the wireless modulator 90 transmits control data to one or more controlled device 60. The reception of the control data causes the controlled device 60 to move and talk as though it is a character in the audio/video presentation.

There is no need to modify the encoded video signal before passing it to the display device 57. Typically, the controller 11 receives the encoded video signal, which is a standard video signal that has been modified to include digital information in the horizontal overscan intervals of the scan lines, which are invisible to the display device 57. Thus, the display device 57 can receive and display the encoded video signal without modification. The controller 11 only needs to extract the control data from the encoded video signal and generate the RF-modulated control signals for transmission to the controlled device 60.

Figure 5:
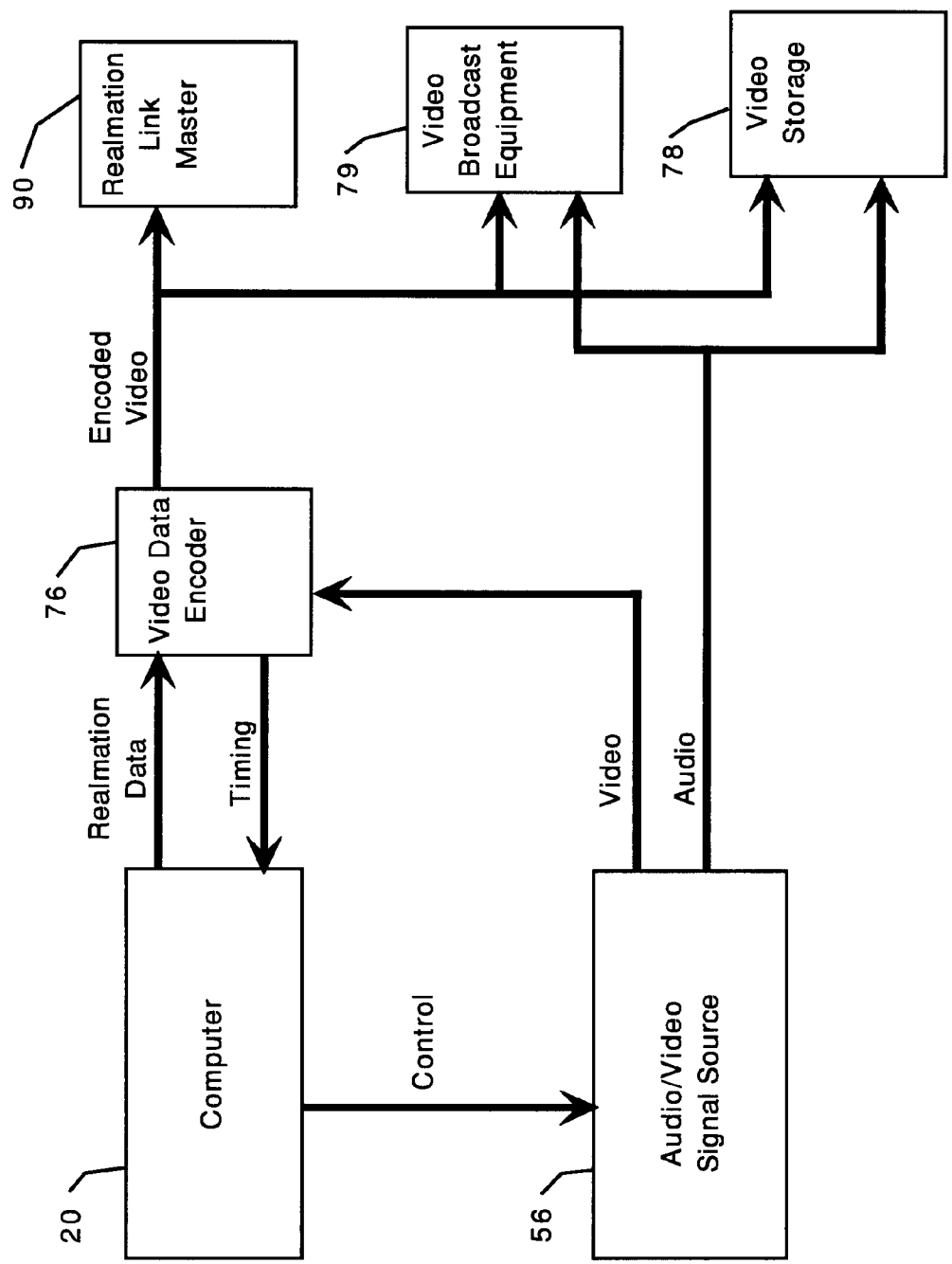
FIG. 5 is a block diagram illustrating a system for creating a data stream including video data and encoded control data.

FIG. 5 is a block diagram illustrating a system for creating an encoded video data stream including video data and encoded control data. A variety of sources, including but not limited to, a video cassette recorder or player, a cable reception box, a TV tuner, a laser disc player, or a computer with a video output, may provide the encoded video. In FIG. 5, the computer system 20 interfaces with a video data encoder 76 and an audio/video signal source 56. The audio/video signal source 56 provides two output signals: video and audio. These output signals may include live camera feeds, prerecorded playbacks, broadcast reception, etc. The computer system 20 controls the operation of the audio/video source 56 via a control signal. The control signal gates the output of the video and audio signals from the audio/video signal source 56.

The computer system 20 also provides the control data, which is encoded onto the video signal. The computer system 20 transfers the control data and gates the video signal to the video data encoder 76. The video data encoder combines the video signal and the control data by encoding the control data onto the video signal (i.e., generating an encoded video data stream). This encoding technique includes modulating the luminance of the horizontal overscan area of the video signal on a line-by-line basis. For example, the overscan area of each scan line may be modulated to represent a single control data bit. Furthermore, the field boundaries of the video signal provide a framing structure for the control data, in which each frame contains a fixed number of data words.

More specifically, each field of the video signal contains a pattern identification word consisting of four bits. The value of the pattern identification word in each contiguous field cyclically sequences through a defined set of values. The presence of the pattern identification word distinguishes an encoded video signal from a normal video signal. In a normal video signal, random noise appears in place of the pattern identification word. A decoder attempting to recover control data from an encoded video signal therefore determines whether the signal is an encoded video signal by detecting the presence of the pattern identification. Thus, the pattern identification word provides an additional layer of integrity to the recovered control data beyond that of simple checksum error detection.

The wireless modulator 90 receives the encoded video signal from the audio/video signal source 56 and recovers the control data from the encoded video signal. The wireless modulator 90 then transmits the control data to one or more controlled device, represented by the controlled device 60 shown in FIG. 4. Alternatively, video broadcast equipment 79 may receive the encoded video signal along with the audio signal and then broadcast the signals to one or more remotely located wireless modulators and/or wireless modems. In another alternative, video storage equipment 78 may receive the encoded video signal along with the audio signal and then store the signals in a storage medium for future retrieval.

Figure 6:
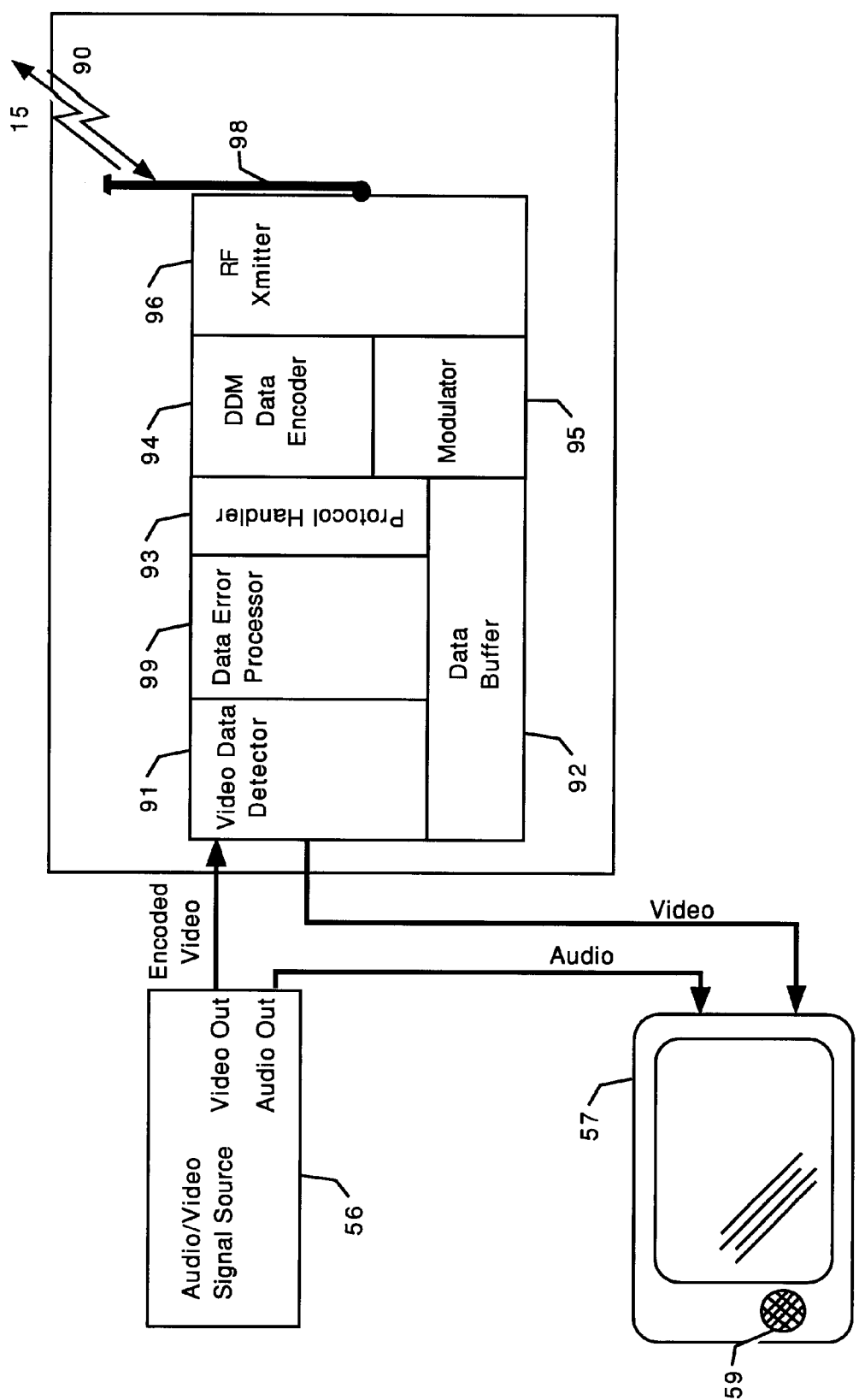
FIG. 6 is a block diagram illustrating the various components and processes that define a wireless modem that forms a part of the controller of FIG. 4.

FIG. 6 is a block diagram illustrating the various components that define the wireless modulator 90. Each of the components of the wireless modulator 90 may be implemented in hardware, software, or a combination of hardware and software. The video data detector 91 of the wireless modulator 90 receives a video signal, originating from an audio/video signal source 56, and identifies whether the video signal is an encoded video signal. If the video data detector 91 detects the presence of the pattern identification word in the received video signal, then the video signal is an encoded video signal. If the signal is an encoded video signal, the video data detector 91 extracts the control data from the encoded video signal, provides the control data to the data error processor 99, and simultaneously provides the encoded video signal to the display device 57.

The data error processor 99 analyzes the control data to detect and attempt to correct any errors that may exist in the control data. After correcting any errors in the control data, the protocol handler 93 receives the recovered and verified control data and assembles message packets for transmission to one or more controlled devices, represented by the controlled device 60. Upon assembling a message packet, the protocol handler 93 provides the message packet to the data encoder 94. The data encoder 94 encodes the data and provides the encoded data to the RF transmitter 96. The RF transmitter 96 receives the encoded data and modulates a predefined RF carrier (i.e., a predefined RF channel approved for use in connection with the wireless communication system) with the encoded data. The RF transmitter then transmits the modulated carrier through the antenna 98. During processing of the control data, the various components of the computer system 20 or the wireless modulator 90 may temporarily store the control data in a data buffer, such as the representative data buffer 92.

The display device 57 receives the video signal from the video data detector 91 or another source along with an audio signal from the audio/video signal source 56. The display device 57 and the speaker 59 then display the audio/visual presentation defined by the video signal, typically including a series of scenes depicted on the display device 57 and the speaker 59, in a conventional manner.

As noted previously, the audio/video presentation on the display device 57 and the control data that is transmitted from antenna 98 are synchronized so that the controlled device 60 behaves as a character in the scene depicted on the display device 57. The processes of detecting the control data, correcting any errors, encoding the control data, and then modulating a carrier may introduce a slight delay. Nevertheless, embedding the control data within the video data in the encoded video signal effectively: synchronizes the operation of the controlled device with the scene depicted on the display device 57. In other words, the video signal received by the display device 57 and the control data transmitted from antenna 98 are synchronized because they are obtained from the same area of the original encoded video signal, in which context sensitive control data is embedded within a video signal. Thus, the encoded video signal may be separated in real-time into control data and related video data so that the controlled devices move and/or talk in a manner that relates to the audio/video presentation.

Controlled Devices: "REALMATION" Performers

Figure 7:
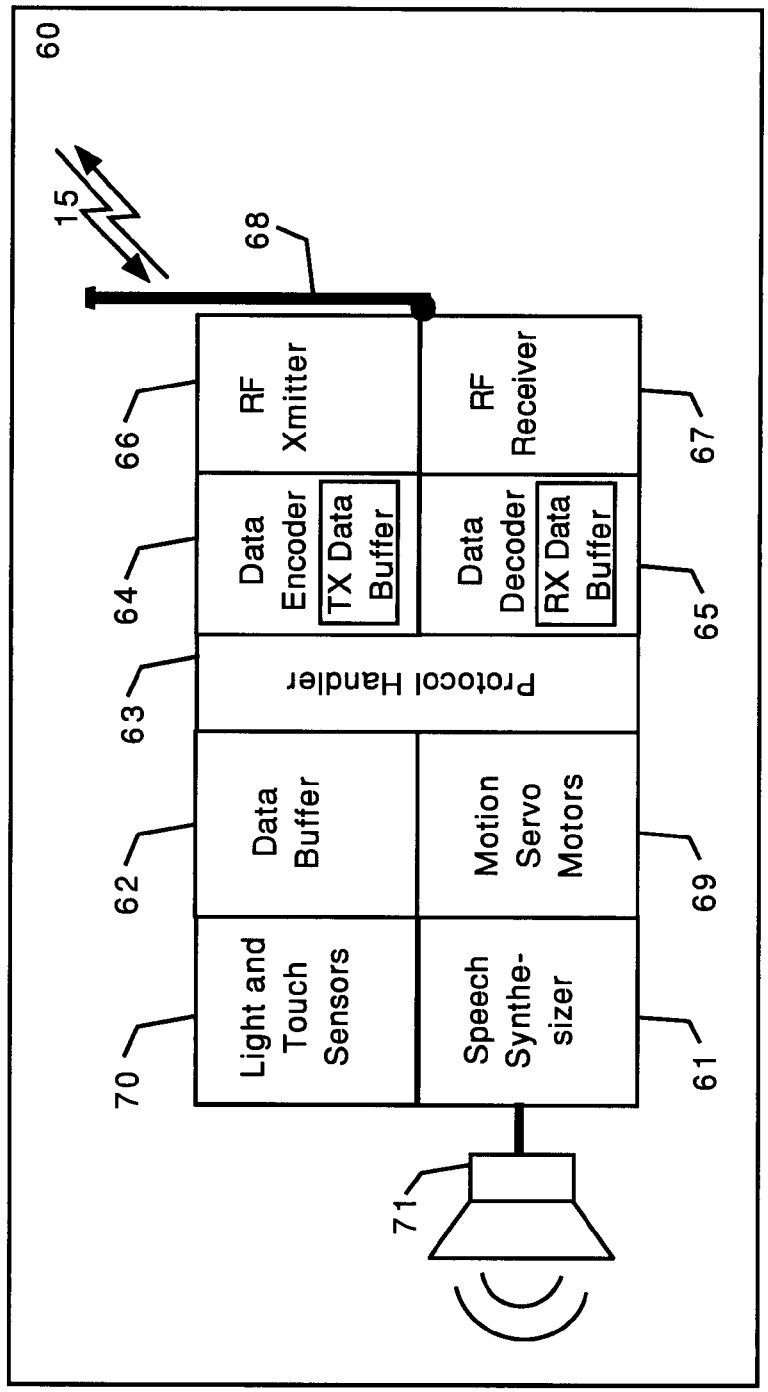
FIG. 7 is a functional block diagram illustrating the various components and processes that define the controlled device of FIG. 4.

FIG. 7 is a functional block diagram illustrating the various components that define a controlled device 60. Each of these components may be implemented in hardware, software, or a combination of hardware and software. Generally, the controlled device 60 includes a microprocessor, or some other type of other processor, for retrieving a program from a ROM, or some other type of non-volatile storage media, and executing the instructions of the program. The controlled device 60 may include hardware components such as an RF radio receiver 67, an RF transmitter 66, an antenna 68, a readable and writable storage memory 62, sensors 70, servo motors 69, a speech synthesizer 61, and a speaker 71.

The RF receiver 67 receives signals from the antenna 68. The RF receiver 67 operates on the received signal by demodulating the carrier and recovering encoded control data. Next, the data decoder 65 receives and decodes the encoded control data. The protocol handler 63 receives the decoded control data output from the decoder 65 and interprets the control data. Based on the content of the control data, the protocol handler 63 routes control data to the appropriate devices, such as data buffers and end effectors within the controlled device 60. Thus, if the control data contains motor movement vectors, one or more of the motion servo motors 69 receives the control data, which causes them to move in accordance with the motor movement vectors. Similarly, if the control data contains voice synthesis coefficients, the speech synthesizer 61 receives the voice synthesis coefficients, converts the voice synthesis coefficients into audio signals, and then provides the audio signals to the speaker 71. Furthermore, the voice synthesis coefficients may be temporarily stored in data buffer 62 so that the controlled device 60 generates voice sounds based on the voice synthesis coefficients while the controlled device 60 transmits response data back to the controller.

The controlled device 60 may also include light sensors and touch sensors 70. The sensors 70 may generate status information in response to variations in pressure, light, temperature, or other parameters. The controlled device 60 may transmit this status information to the controller 10 shown in FIG. 1. This process includes formatting the status information in the protocol handler 63, encoding the status information in the data encoder 64, modulating a carrier with the encoded status information in the RF transmitter 66, and then transmitting the modulated carrier over the RF communications path 15 through the antenna 68.

Creating and Using an Encoded Video Signal

Figure 8:
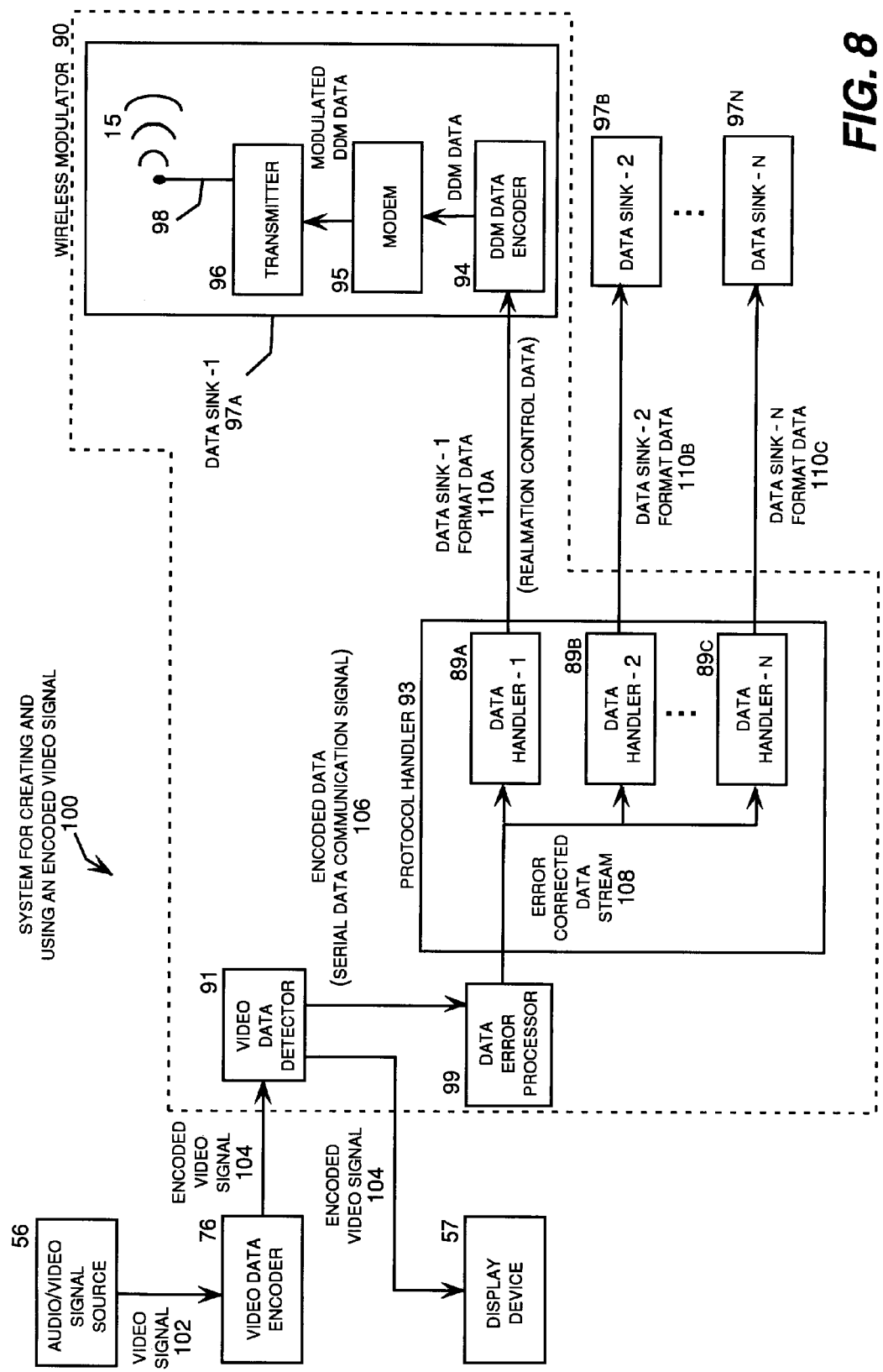
FIG. 8 is a functional block diagram of a system for creating and using an encoded video signal to control a plurality of data sinks.

FIG. 8 is a functional block diagram of a system 100 for creating and using an encoded video signal to control a plurality of data sinks 97a–n. The system 100 includes an audio/video signal source 56 that provides a video signal 102 to a video data encoder 76. The audio/video signal source 56 may be any of a variety of conventional video sources, such as a video camera, a broadcast or cable television signal, a video tape player, the Internet transmitting a video signal, a computer generating a video signal, and so forth. The video signal 102 may be any type of video signal that includes a plurality of frames that each include a plurality of scan lines. For example, the video signal 102 may be a standard 525-line, two-field interlaced NTSC television signal that includes 30 frames per second, each frame including two fields of 262.5 interlaced lines, as is well known to those skilled in the art.

The video data encoder 76 concatenates encoded data with the lines of the video signal 102 to create an encoded video signal 104, as described in detail with respect to FIGS. 9A–B and 10A–B. A protocol is defined for the encoded data that is addressable, forwardly compatible, error tolerant, and feasible to deploy in connection with a system that is primarily intended to be a children's entertainment product. This protocol is described in detail with respect to FIGS. 11 and 12A–B.

The video data encoder 76 transmits the encoded video signal 104 to a video data detector 91, which may be a remote device that receives the encoded video signal 104 by way of a broadcast-level transmission. Alternatively, video data detector 91 may be a local device, for example in an intercom application. The encoded data does not interfere with the transmission of the underlying video signal 102. Thus, the encoded video signal 104 may be transmitted using any type of video transmission media, such as a broadcast-level cable television signal, a video tape player, the Internet transmitting a video signal, a computer generating a video signal, and so forth. In addition, because the encoded data is located in the pre-visible or post-visible portions of the video signal 102, the encoded data does not visibly interfere with the operation of typical televisions or monitors. Therefore, the encoded video signal 104 may be passed directly from the video data detector 91 to the display device 57, which displays the underlying video signal 102 undisturbed by the encoded data.

The video data detector 91 detects the presence of the encoded data in the encoded video signal 104 by detecting the presence of an intelligent signal detection word (ISDW), as described with reference to FIGS. 10A–B and 11. Preferably, a single ISDW is transmitted in the same location of each field of the encoded video signal 104, such as lines 23–29 in field-1 and 286–292 in field-2, of a standard interlaced 525-line NTSC television signal. A consecutive series of the ISDWs defines a dynamic validation sequence in which each ISDW varies in at least two bits from the immediately preceding signal detection word. For example, the dynamic validation sequence may be the binary representation of 8, 1, 10, 3, 12, 5, 14, 7.

The video data detector 91 reads the data, if any, in the specified lines, corrects the data for correctable errors that may have occurred in the ISDW bits, and detects the presence of the ISDW. In each frame, the ISDW is typically followed by a number of content words. If the video data detector 91 detects the presence of the ISDW in the encoded video signal 104, it extracts the content words from the encoded video signal and assembles the content words into a serial data communication signal 106. The video data detector 91 then transmits the serial data communication signal 106 to a data error processor 99.

The data error processor 99 strips out the error correction bits, corrects any correctable errors in the content bits, and assembles the corrected content words into a 9-bit error corrected data stream 108. This 9-bit error corrected data stream 108 is transmitted to a protocol handler 93, which includes a number of data handlers 89*a–n* that detect and route device-specific control data to their associated data sinks 97*a–n*. The addressing protocol for the content data is described with reference to FIGS. 12A–B. Each data handler 89*a–n* detects address data, including a short or long address assigned to its associated data sink 97*a–n*, and responds by routing the following device-specific control data 110*a–n* to its associated data sink 97*a–n*. Each data handler 89*a–n* may also reformat the device-specific control data into appropriately-formatted data streams for its associated data sink 97*a–n*.

In particular, one of the data sinks 97*a* reformats the device-specific control data into MIDI format for transmission to a wireless controlled device 60 by way of a DDM encoder 94, a modulator 95, and a transmitter 96, as described previously. In addition, one particular method for operating the DDM encoder 94 is described in U.S. application Ser. No. 08/794,921 entitled "A SYSTEM AND METHOD FOR CONTROLLING A REMOTE DEVICE," inventors Leonardo Del Castillo, Damon Danielli, Scott Randall, Craig Ranta, and Harjit Singh, filed on Feb. 4, 1997, which is owned by a common assignee and incorporated herein by reference.

FIGS. 9A and 9B show the location of the encoded data in the context of a single scan line of the encoded video signal 104. FIG. 9A is a wave form diagram illustrating a data bit value "one" 128 encoded in the horizontal overscan portion of a scan line of the encoded video signal 104. The scan line represents one line of one frame displayed on the display device 57. The vertical axis represents the magnitude of the signal wave form 120 in units of IRE and the horizontal axis represents time in micro-seconds, as is familiar to those skilled in the art. Although FIGS. 9A–B are not drawn precisely to scale, important reference points are marked in the units of their corresponding axis. The wave form 120 for the scan line begins with a horizontal synchronization pulse 122 down to −40 IRE, which is a timing signal that indicates the beginning of the scan line (i.e., time=0) when the leading edge of the pulse passes through −20 IRE to establish the horizontal reference point "H-REF." The horizontal synchronization pulse 122 is followed by a sinusoidal color burst 124 (the approximate envelope is shown), which is used as a calibration signal for the display device 57. The color burst 124 is followed by a wave form representing the visible raster 126 (the approximate envelope is shown), which creates and typically overlaps slightly the visible image on the display device 57.

The wave form 120 includes a pre-visible horizontal overscan area 127, approximately from 9.2 micro-seconds to 10.2 micro-seconds after H-REF, that occurs after the color burst 124 and before the visible raster 126. The video data encoder 76 locates a pre-visible (i.e., before the visible raster 126) data bit "one" 128 by driving the wave form 120 to a predetermined high value, such as 80 IRE, in the interval from 9.2 micro-seconds to 10.2 micro-seconds after H-REF. Because the pulse denoting the data bit "one" 128 occurs after the calibration interval of the color burst 124 and before the visible raster 126, it does not interfere with the operation of the display device 57 or appear on the image displayed.

FIG. 9B is a wave form diagram illustrating a data bit value "zero" 128' encoded in the horizontal overscan portion of a scan line of the encoded video signal 104. The video data encoder 76 locates the pre-visible data bit "zero" 128' by driving the wave form 120 to a predetermined low value, such as 7.5 IRE, in the interval from 9.2 micro-seconds to 10.2 micro-seconds after H-REF.

As noted above, each 16-bit content word includes nine data bits, and each frame includes 13 content words. Thus, encoding one bit per scan line produces a bandwidth for the data encoded in a typical 59.94 Hertz NTSC video signal of 7,013 Baud. This bandwidth is sufficient to provide the data sink 97*a* with sufficient data to control several wireless controlled devices 60 in the manner described above. See also, the related patent application, U.S. application Ser. No. 08/795,710 entitled "PROTOCOL FOR A WIRELESS CONTROL SYSTEM" filed on Feb. 4, 1997, which is assigned to a common assignee and incorporated herein by reference.

The 7,013 Baud one-bit-per-scan-line bandwidth of the encoded data is also sufficient to control several other data sink 97*b*–*n* to provide additional services, such as advertising, subscription, and emergency warning information for transmission to the display device 57 and other data sinks. For example, these services might include e-mail, foreign language subtitling, intercom capability, telephone pages, weather warnings, configuration data for a set-top box, and so forth. At present, the 7,013 Baud one-bit-per-scan-line bandwidth is preferred because it provides sufficient bandwidth for the "REALMATION" system and minimizes the cost of the system components, in particular the video data encoder 76 and the video data detector 91. The bandwidth may be increased, however, by locating a second pulse in the post-visual horizontal overscan area 130, which occurs after the visible raster 126 and before the horizontal blanking interval 132 (during which the electron gun in the CRT of the display device 57 sweeps back from the end of the just completed scan line to the beginning of the next scan line).

And the bandwidth may be further increased by enabling each pulse 128, 130 to represent more that just two (1, 0) states. For example, for 3 states (c.f., the 1.0, 1.5, 2.0 DDM pulse widths), an analog of the "REALMATION" DDM protocol could be used. For 4 states, the pulse could represent 2 bits (e.g., 100–80 IRE=1,1; 70–50 IRE=1,0; 40–20 IRE=0,0; 10 to –40 IRE=0,1). For 8 states, the pulse could represent 3 bits; for 16 states, the pulse could represent 4 bits, and so forth. For example, if the system 100 were to employ data pulses in both the pre-visual horizontal overscan area 127 and the post-visual horizontal overscan area 130, each data pulse having 16 states, each scan line would be able to transmit eight bits. This would increase the bandwidth from 7,013 Baud to 56,104 Baud, which might be worth the increased cost for the video data encoder 76 and the video data detector 91 for future applications.

FIGS. 10A and 10B show the location of encoded data in the context of a standard NTSC video frame. FIG. 10A is a diagram illustrating the location of data bits in a portion of a standard 525-line two-field interlaced NTSC video signal. Each frame of the video data includes a vertical blanking interval 140. (during which the electron gun in the CRT of the display device 57 sweeps back and up from the end of the just completed frame to the beginning of the next frame) followed by an active video interval 142, which includes a number of left-to-right scan lines that sequentially paint the display device 57 from the top to the bottom of the screen. At the end of the vertical blanking interval 140, the last two pulses are typically reserved for closed caption data 146 and vertical blanking data 148, which may be already dedicated to other purposes. In addition, the bottom of each field is typically corrupted by head switching noise present in the output of helical-scan video tape players of consumer formats such as VHS and 8 mm. Therefore, the horizontal overscan portion of individual scan lines provides the preferred location for encoded data bits 128, 128' of the encoded video signal 104.

FIG. 10B is a diagram illustrating the location of data bits in the two interlaced fields of the standard NTSC video frame. That is, FIG. 10B shows the location of the encoded data in the context of a complete NTSC 525-line two-field interlaced video frame. The frame of video data includes lines 1–262 in field-1 152 interlaced with lines 263–525 in field-2 154. Field-1 152 includes a vertical blanking interval 140*a* and an active video interval 142*a*. The blanking interval 140*a* includes lines 1–22 and concludes with line 21, which may include closed caption data 146*a*, and line 22, which may include vertical blanking data 148*a*. An ISDW 156*a* is encoded in lines 23–29 and content data 158*a* is encoded in lines 30–237. Field-2 154 includes a vertical blanking interval 140*b* and a active video interval 142*b*. The vertical blanking interval 140*b* includes lines 263–284 and concludes with line 283, which may include closed caption data 146*b*, and line 284, which may include verticlal blanking data 148*b*. An ISDW 156*b* is encoded in lines 286–292 and content data 158*b* is encoded in lines 293–500.

Each ISDW preferably includes a plurality of data bits and a plurality of error correction bits defining a correction sequence that allows a single-bit error in the data bits to be detected and corrected. For example, the ISDW may include a seven-bit Hamming code (i.e., four data bits and three error its) in the format shown below in Table 1.

TABLE 1

| Video Line Number | | | |
|---|---|---|---|
| Field 1 | Field 2 | Symbol | Description |
| 23 | 286 | Q0 | Sequence Word Bit 0 |
| 24 | 287 | Q1 | Sequence Word Bit 1 |
| 25 | 288 | Q2 | Sequence Word Bit 2 |
| 26 | 289 | Q3 | Sequence Word Bit 3 |
| 27 | 290 | B0 | B0 = Q1 × Q2 × Q3 |
| 28 | 291 | B1 | B1 = Q0 × Q1 × Q3 |
| 29 | 292 | B2 | B2 = Q0 × Q2 × Q3 |

In each field 152, 154 of a video frame, up to 13 16-bit content words 158 may follow the ISDW 156, as shown below in Table 2.

TABLE 2

| Word Value Range | | |
|---|---|---|
| Field 1 | Field 2 | Defined Class |
| 30 | 293 | Start of Content Word 0 |
| 46 | 309 | Start of Content Word 1 |
| 62 | 325 | Start of Content Word 2 |
| 78 | 341 | Start of Content Word 3 |
| 94 | 357 | Start of Content Word 4 |
| 110 | 373 | Start of Content Word 5 |
| 126 | 389 | Start of Content Word 6 |
| 142 | 405 | Start of Content Word 7 |
| 158 | 421 | Start of Content Word 8 |
| 174 | 437 | Start of Content Word 9 |
| 190 | 453 | Start of Content Word 10 |
| 206 | 469 | Start of Content Word 11 |
| 222 | 485 | Start of Content Word 12 |
| 237 | 500 | End of Content Word 12 |
| 238–263 | 517–525 | Unused video lines |

Each content word preferably includes a plurality of data bits 164 and a plurality of error correction bits 166 defining a correction sequence that allows a single-bit error in the data bits to be detected and corrected. For example, the content word may include a seven-bit Hamming code (i.e., four data bits and three error correction bits) and a nine-bit Hamming code (i.e., five data bits and four error correction bits) in the format shown below in Table 3.

TABLE 3

| Offset from first line | Symbol | Description |
|---|---|---|
| +0 | M0 | Data Bit 0 |
| +1 | M1 | Data Bit 1 |
| +2 | M2 | Data Bit 2 |
| +3 | M3 | Data Bit 3 |
| +4 | B0 | B0 = M1 × M2 × M3 |
| +5 | B1 | B1 = M1 × M1 × M3 |
| +6 | B2 | B2 = M1 × M2 × M3 |
| +7 | M4 | Data Bit 4 |
| +8 | M5 | Data Bit 5 |
| +9 | M6 | Data Bit 6 |
| +10 | M7 | Data Bit 7 |
| +11 | M8 | Data Bit 8 |
| +12 | B3 | B3 = M4 × M5 × M6 × M7 |
| +13 | B4 | B4 = M4 × M5 × M7 × M8 |
| +14 | B5 | B5 = M4 × M6 × M7 × M8 |
| +15 | B6 | B6 = M5 × M6 × M7 × M8 |

Although many other, often more sophisticated, data correction techniques may be used, Hamming codes are preferred because of their simplicity and small computation requirement.

Figure 11:
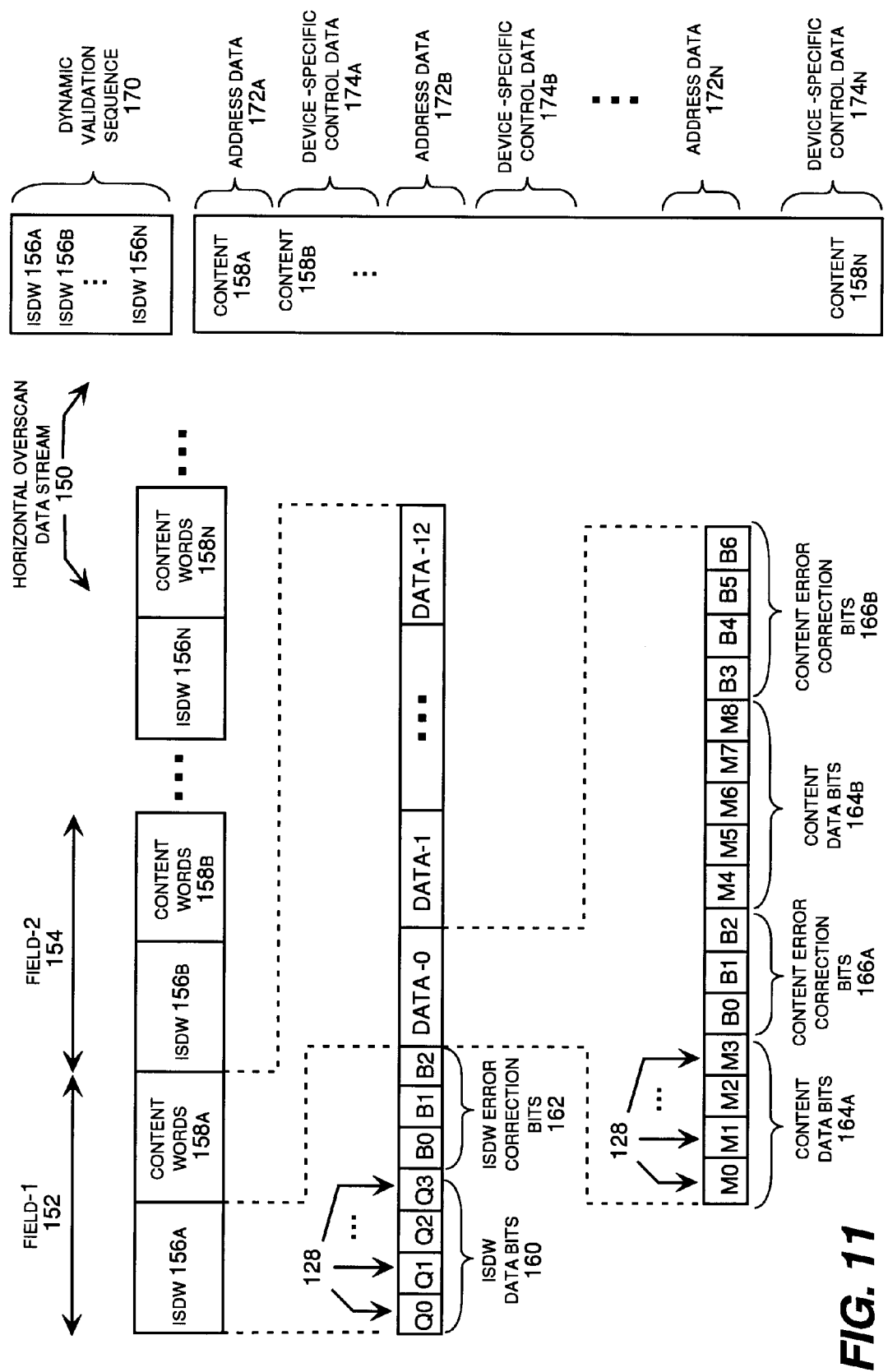
FIG. 11 is a message protocol diagram illustrating the format of the horizontal overscan data stream of an encoded video signal.

FIG. 11 is a message protocol diagram illustrating the format of the horizontal overscan data stream 150 of the encoded video signal 104. The horizontal overscan data stream 150 is typically created by the video data detector 91, which extracts the data from the encoded video signal 104 and assembles the extracted data into the serial data communication signal 106. Each field of the horizontal overscan data stream 150 includes intelligent signal detection data, typically a single 7-bit ISDW, and content data, typically 13 16-bit content words. The representative ISDW 156a includes four data bits 160 and three error correction bits 162, as shown Table 1, above. The representative content word 158a includes four data bits 164a, followed by three error correction bits 166a, followed by five data bits 164b, followed by four error correction bits 166b, as shown Tables 2 and 3, above.

A consecutive series of the ISDWs 155a–n defines a dynamic validation sequence 170 in which each ISDW varies in at least two bits from the immediately preceding signal detection word. For example, the dynamic validation sequence may be the binary representation of 8, 1, 10, 3, 12, 5, 14, 7. Causing the dynamic validation sequence 170 to vary in at least two bits in each successive ISDW reduced the chance that random noise may be misinterpreted as ISDW data.

The content data includes address data 172 and device-specific control data 174. Thus, the protocol for the content data is addressable so that device-specific control data may be directed to a number of different data sinks 97a–n. The addressable nature of the content data is represented by the address data 172a–n and the device-specific control data 174a–n. To limit the bandwidth requirement of the address data 172, a limited number of predefined short addresses are preferably reserved for assignment to data sinks. To further extend the addressability of the protocol, two short addresses are reserved for denoting the beginning and end of long addresses. This allows a virtually unlimited number of variable length long addresses to be assigned in the future.

The first data bit of each short address differentiates between address words and device-specific control words (0=address; 1=device-specific control data). For an address word, the eight bits that follow the address identification bit allow up to 256 addresses. The first 254 addresses are short address classes that may be preassigned to specific classes of controlled devices. The last two addresses (0FE and 0FF) are used as start and stop delimiters for a long address. Thus, a virtually infinite number of additional class addresses of variable length may be assigned in the future using the long address delimiters. This provides the protocol with a very high degree of forward extensibility. The addressing protocol is shown below in Table 4.

TABLE 4

| Word Value Range | | |
|---|---|---|
| (Binary) | (HEX) | Defined Class |
| 0 0000 0000 | 000 | The NULL Address |
| 0 xxxx xxxx | 001–0FD | Short Address Class |
| 0 1111 1110 | 0FE | Begin Long Address Block |
| 0 1111 1111 | 0FF | End Long Address Block |

Figures 12A, 12B:
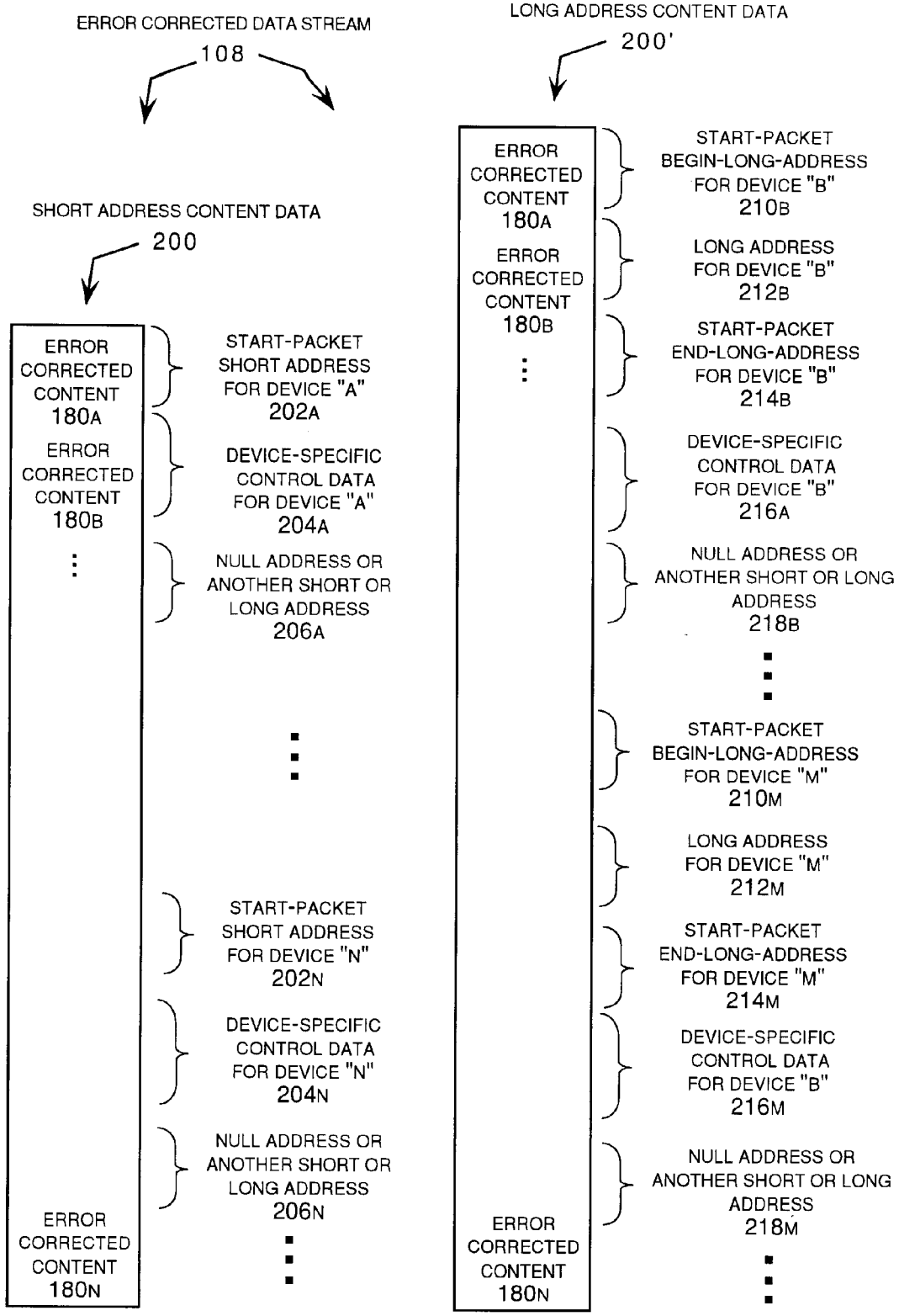
FIG. 12A is a message protocol diagram illustrating the format of short address content data of an encoded video signal.
FIG. 12B is a message protocol diagram illustrating the format of long address content data of an encoded video signal.

FIG. 12A is a message protocol diagram illustrating the format of short address content data in the encoded video signal 104. The content data preferably includes the error corrected content data bits assembled into a 9-bit data steam by the data error processor 99. To address a data packet to a particular short-address data sink 97a, that data sink's short address is transmitted in the encoded video signal 104. The first occurrence of the data sink's short address is interpreted as a start-packet message 202a by the data handler 89a, which responds by beginning the routing of subsequently-received device-specific control data to the data sink 97a. The start-packet message 202a, therefore, is followed by device-specific control data 204a for the selected data sink 97a.

The packet for the data sink 97a is ended by transmitting either the NULL address or another long or short address in the encoded video signal 104. The new short address is interpreted as an end-packet message 206a by the data handler 89a, which responds by discontinuing the routing of subsequently-received device-specific control data to the data sink 97a. This addressing procedure may be repeated, as desired, for each data sink that is assigned a short address.

As noted above, to further extend the addressability of the protocol, two short addresses are reserved for denoting the beginning and end of long addresses. FIG. 12B is a message protocol diagram illustrating the format of long address content data in the encoded video signal 104. To address a data packet to a particular long-address data sink 97b, the short address dedicated to denoting a begin-long-address message 210b (0FE) is transmitted in the encoded video signal 104. The desired data sink's long address 212b is then transmitted, followed by the short address dedicated to denoting an end-long-address message 214b (0FF). The first occurrence of the data sink's long address is interpreted as a start-packet message by the data handler 89b, which responds by beginning the routing of subsequently-received device-specific control data to the data sink 97b. The start-packet message 202a, therefore, is followed by device-specific control data 204a for the data sink 97a.

The packet for the data sink 97b is ended by transmitting a further address word in the encoded video signal 104. The new address is interpreted as an end-packet message by the data handler 89b, which responds by discontinuing the routing of subsequently-received device-specific control data to the data sink 97b. This addressing procedure may be repeated, as desired, for each data sink that is assigned a long address.

Figure 13:
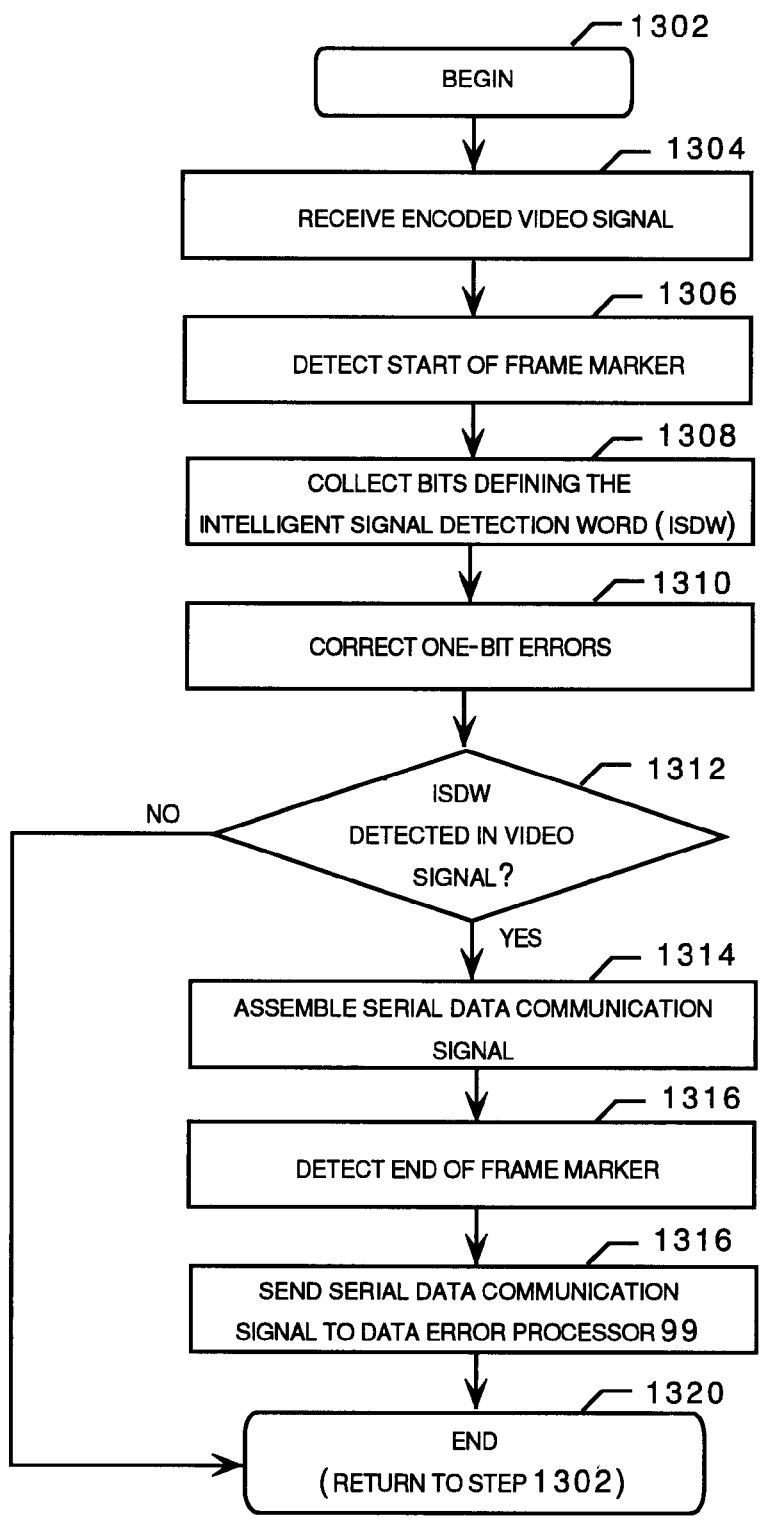
FIG. 13 is a logic flow diagram illustrating the operation of a video data detector in a system for creating and using an encoded video signal to control a plurality of data sinks.

FIG. 13 is a logic flow diagram illustrating routine 1300 for the video data detector 91. Routine 1300 begins in step 1302, and in step 1304 the video data detector 91 receives the encoded video signal 104 from the video data encoder 76. In step 1306, the video data detector 91 detects a start of frame marker. In step 1308, the video data detector 91 collects the bits in the ISDW region of the frame, and in step 1310 the video data detector 91 corrects any correctable, typically one-bit, errors in the data. In step 1312, the video data detector 91 determines whether the data collected from the ISDW region of the frame is, in fact, an ISDW.

Specifically, the video data detector 91 determines whether a consecutive series of the ISDWs correspond to the dynamic validation sequence 170, in which each ISDW typically varies in at least two bits from the immediately preceding signal detection word. For example, the dynamic validation sequence may be the binary representation of 8, 1, 10, 3, 12, 5, 14, 7. If the dynamic validation sequence 170 is detected, the "YES" branch is followed from step 1312 to step 1314, in which the video data detector 91 assembles the content words 158 into the serial data communication signal 106. In step 1316, the video data detector 91 detects an end of frame marker, and in step 1318 the video data detector 91 transmits the serial data communication signal 106 for the frame to the data error processor 99. Step 1318 and the "NO" branch from step 1312 are followed by the "END" step 1320, which returns step 1302 so that routine 1300 may repeat for the next frame of data.

Figure 14:
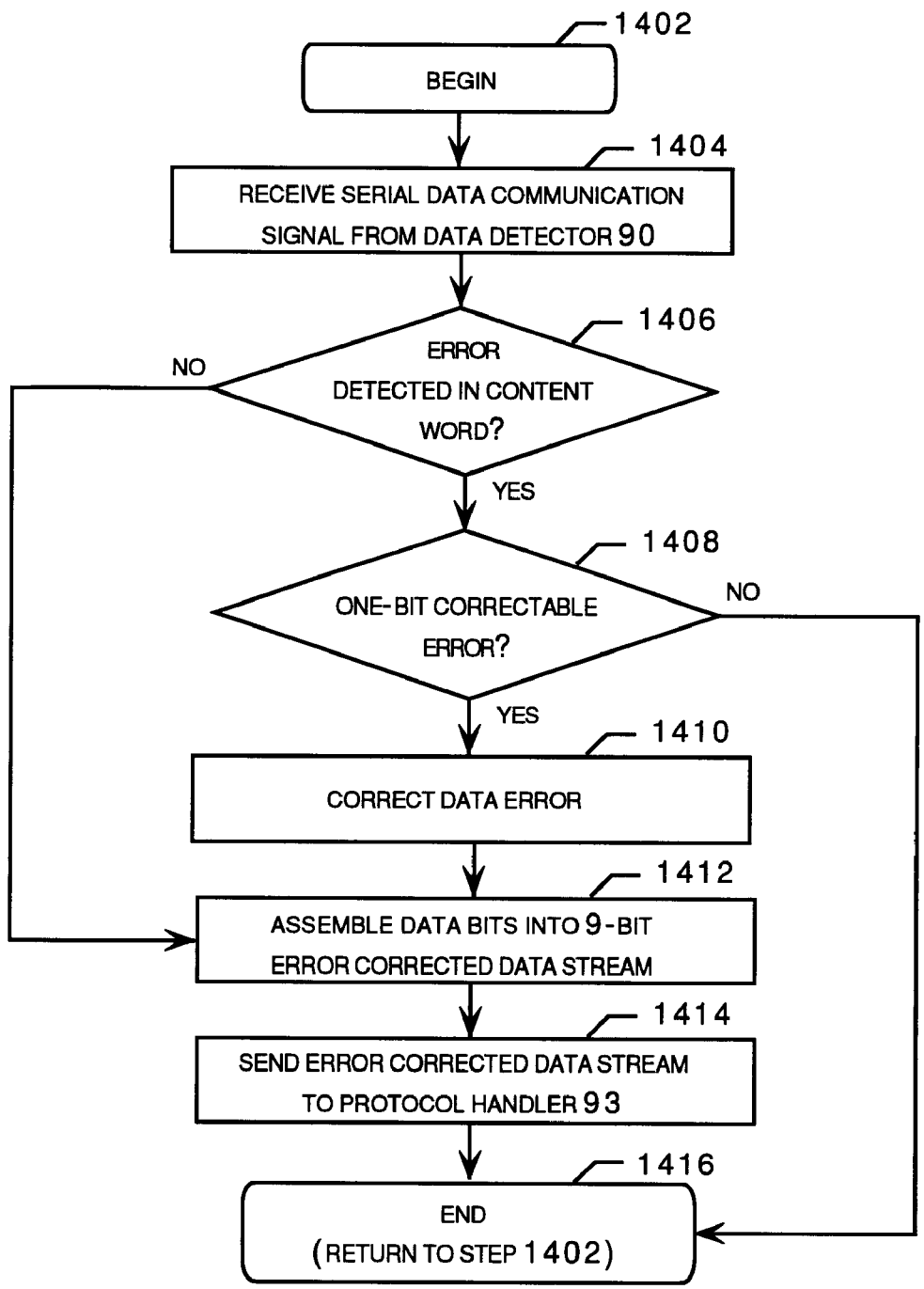
FIG. 14 is a logic flow diagram illustrating the operation of a data error detector in a system for creating and using an encoded video signal to control a plurality of data sinks.

FIG. 14 is a logic flow diagram illustrating routine 1400 for the data error processor 99. Routine 1400 begins in step 1402, and in step 1404 the data error processor 99 receives the serial data communication signal 106 from the video data detector 91. In step 1406, the data error processor 99 determines whether a data error is detected in the content data bits 164 of the serial data communication signal 106. If a data error is not detected in the content data bits 164 of the serial data communication signal 106, the "NO" branch is followed to step 1412, which is described below. If a data error is detected in the content data bits 164 of the serial data communication signal 106, the "YES" branch is followed to step 1408, in which the data error processor 99 determines whether the error is a correctable, typically one-bit, data error.

If the error is a correctable data error, the "YES" branch is followed from step 1408 to step 1410, in which the data error processor 99 corrects the error. In step 1412, the data error processor 99 assembles the content data bits 164 into a 9-bit error corrected data stream 108. And in step 1414, the data error processor 99 transmits the 9-bit error corrected data stream 108 to the protocol handler 93. Step 1414 and the "NO" branch from step 1408 are followed by the "END" step 1416, which returns step 1402 so that routine 1400 may repeat for the next serial data communication received from the video data detector 91.

Figure 15:
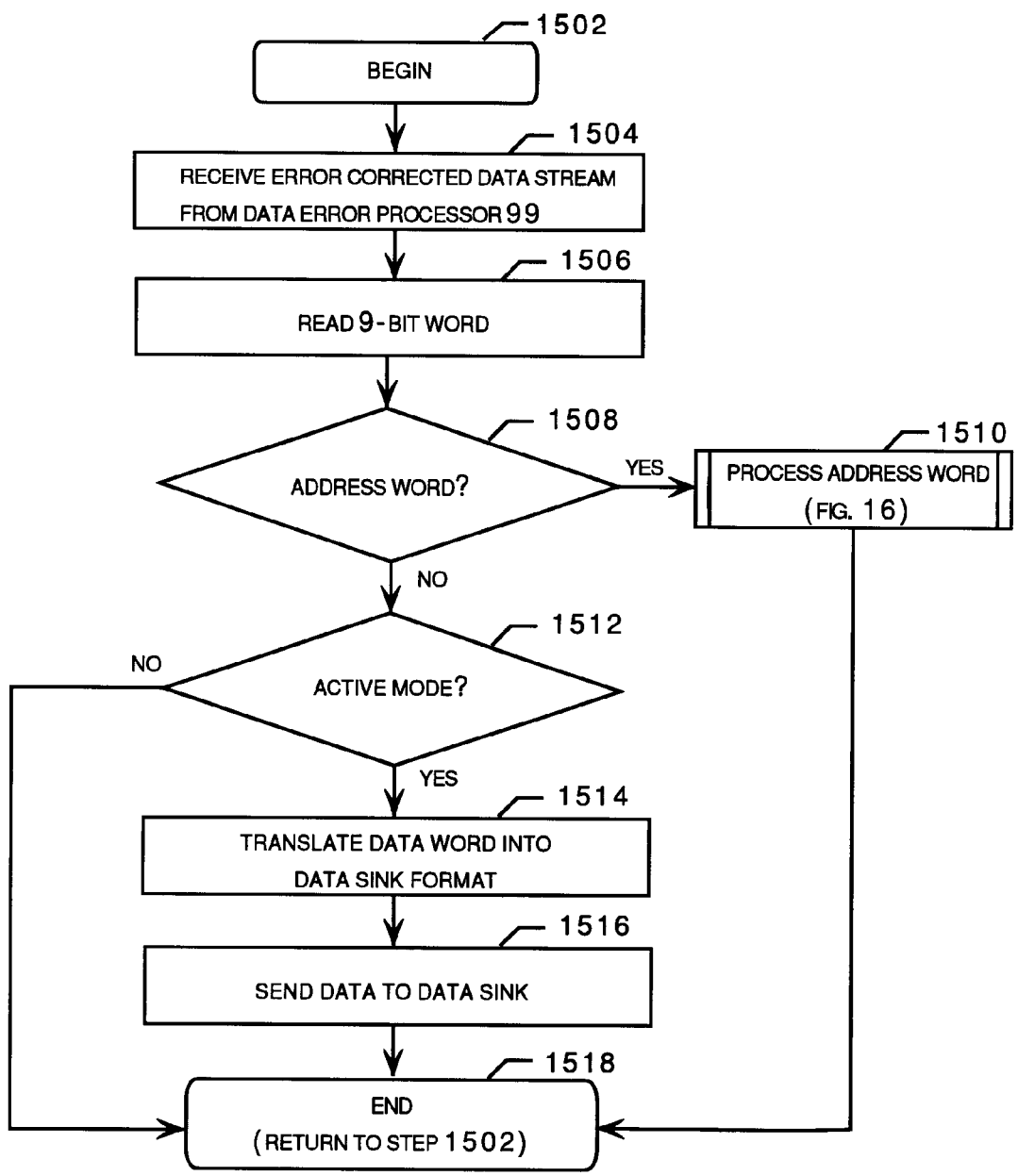
FIG. 15 is a logic flow diagram illustrating the operation of a protocol handler for short addresses in a system for creating and using an encoded video signal to control a plurality of data sinks.

FIG. 15 is a logic flow diagram illustrating routine 1500 for a data handler 89 of the protocol handler 93 that is configured to respond to short addresses. Routine 1500 begins in step 1502, and in step 1504 the data handler 89 receives the 9-bit error corrected data stream 108 from the data error processor 99. In step 1506, the data handler 89 reads a 9-bit content word. In step 1508, the data handler 89 determines whether the content word is an address word, preferably by checking to see whether the last data bit is a zero. If the content word is an address word, the "YES" branch is followed to routine 1510, in which the data handler 89 process the address word. Routine 1510 is described below with reference to FIG. 16.

If the content word is not an address word (i.e., the content word is device-specific control data), the "NO" branch is followed from step 1508 to step 1512, in which the data handler 89 determines whether it is in its active mode. That is, the data handler 89 determines whether it has previously been toggled to the active mode by receiving the short address for its associated data sink 97. If the data handler 89 is in its active mode, the "YES" branch is followed from step 1512 to step 1514, in which the data handler 89 translates the device-specific control data into the appropriate format for its associated data sink 97. In step 1516, the data handler 89 transmits the data sink format data 110 to its associated data sink 97. Step 1516, as well as routine 1510 and the "NO" branch from step 1512, are followed by the "END" step 1518, which returns step 1502 so that routine 1500 may repeat for the next 9-bit content word.

Figure 16:
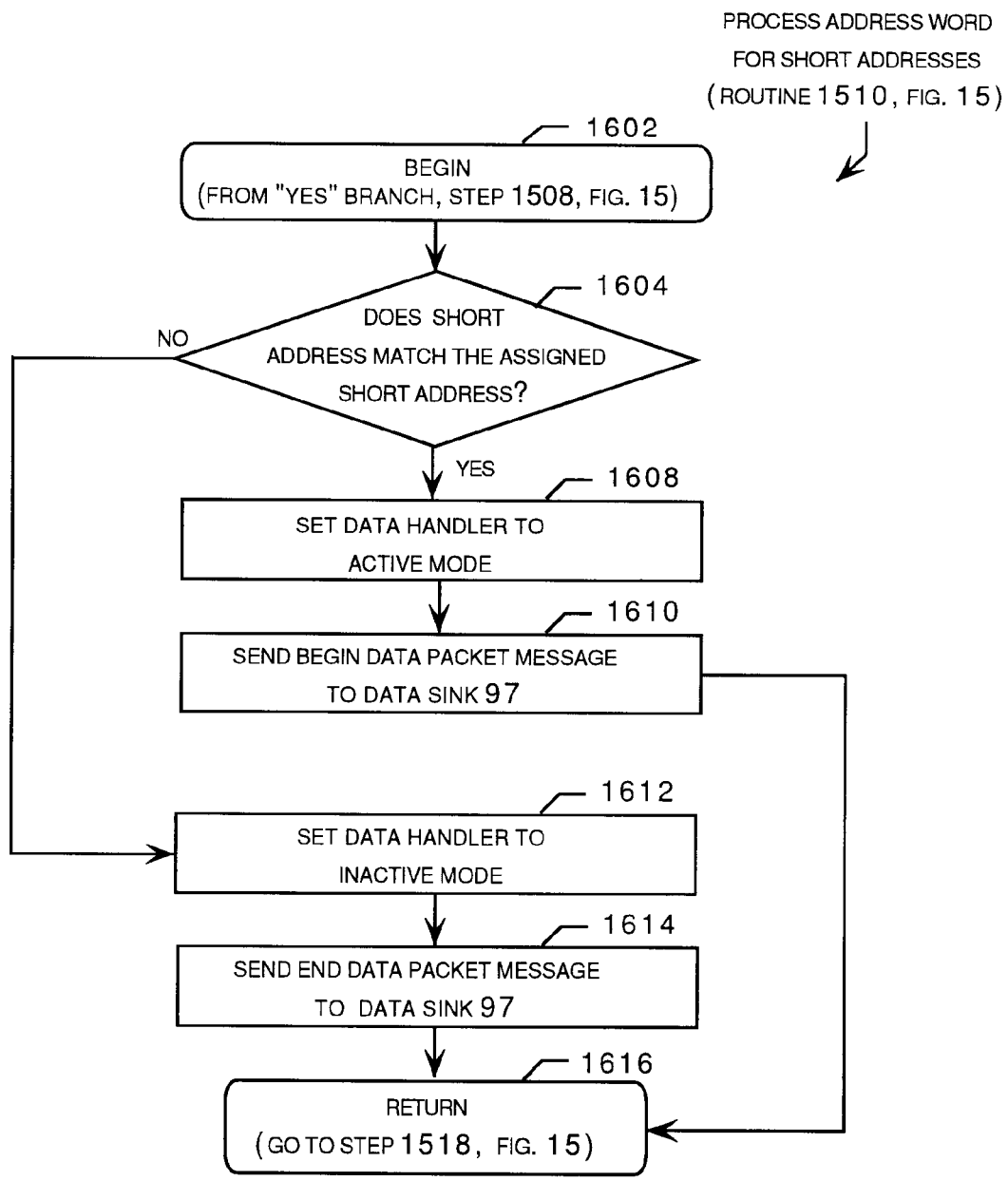
FIG. 16 is a logic flow diagram illustrating the processing of short addresses in the protocol handler of FIG. 15.

FIG. 16 is a logic flow diagram illustrating routine 1510 for processing short address words. Routine 1510 begins in step 1602 following the "YES" branch from step 1508, which is shown in FIG. 15. In step 1604, the data handler 89 determines whether the received address is the short address that matches the short address assigned to its associated data sink 97. If the received address matches the short address assigned to its associated data sink 97, the "YES" branch is followed to step 1608, in which the data handler 89 is set to the active mode. Because device-specific control data for the data sink 97 will follow immediately, the data handler 89 typically sends a "begin data packet" message to its associated data sink 97 in step 1610. Step 1610 is followed by the "RETURN" step 1616, which returns to step 1518, shown on FIG. 15.

Referring again to step 1604, if the received address does not match the assigned short address, the "NO" branch is followed to step 1612, in which the data handler 89 is set to the inactive mode. Because this signals the end of a data packet, which means that device-specific control data for the data sink 97 will not follow immediately, the data handler 89 typically sends an "end data packet" message to its associated data sink 97 in step 1614. Step 1614 is followed by the "RETURN" step 1616, which returns to step 1518, shown on FIG. 15.

Figure 17:
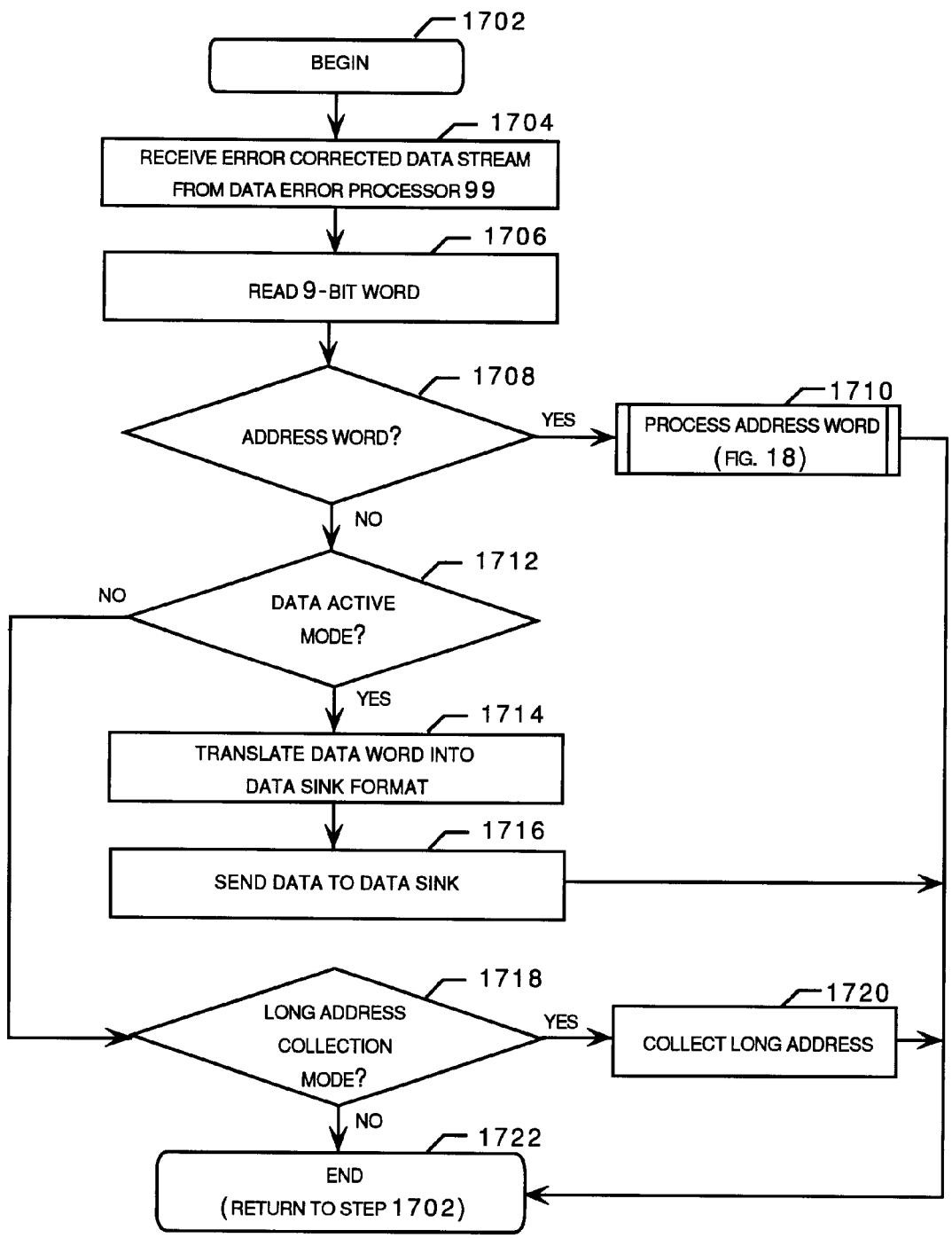
FIG. 17 is a logic flow diagram illustrating the operation of a protocol handler for long addresses in a system for creating and using an encoded video signal to control a plurality of data sinks.

FIG. 17 is a logic flow diagram illustrating routine 1700 for a data handler 89 of the protocol handler 93 that is configured to respond to long addresses. Routine 1700 begins in step 1702, and in step 1704 the data handler 89 receives the 9-bit error corrected data stream 108 from the data error processor 99. In step 1706, the data handler 89 reads a 9-bit content word. In step 1708, the data handler 89 determines whether the content word is an address word, preferably by checking to see whether the last data bit is a zero. If the content word is an address word, the "YES" branch is followed to routine 1710, in which the data handler 89 process the address word. Routine 1710 is described below with reference to FIG. 18.

If the content word is an address word (i.e., the content word is device-specific control data), the "NO" branch is followed from step 1708 to step 1712, in which the data handler 89 determines whether it is in its data active mode. That is, the data handler 89 determines whether it has previously been toggled to its data active mode by receiving the long address for its associated data sink 97. If the data handler 89 is in its data active mode, the "YES" branch is followed from step 1712 to step 1714, in which the data handler 89 translates the device-specific control data into the appropriate format for its associated data sink 97. In step 1716, the data handler 89 transmits the data sink format data 110 to its associated data sink 97. Step 1716 is followed by the "END" step 1722, which returns step 1702 so that routine 1700 may repeat for the next 9-bit content word.

If the data handler 89 is not in its data active mode, the "YES" branch is followed from step 1712 to step 1718, in which the data handler 89 determines whether it is in its long address collection mode. If the data handler 89 is in its long address collection mode, the "YES" branch is followed to step 1720, in which the data handler 89 collects the data bits of the current content word as part of a long address. If the data handler 89 is not in its long address collection mode, the "NO" branch is followed to the "END" step 1722, which returns step 1702 so that routine 1700 may repeat for the next 9-bit content word.

Figure 18:
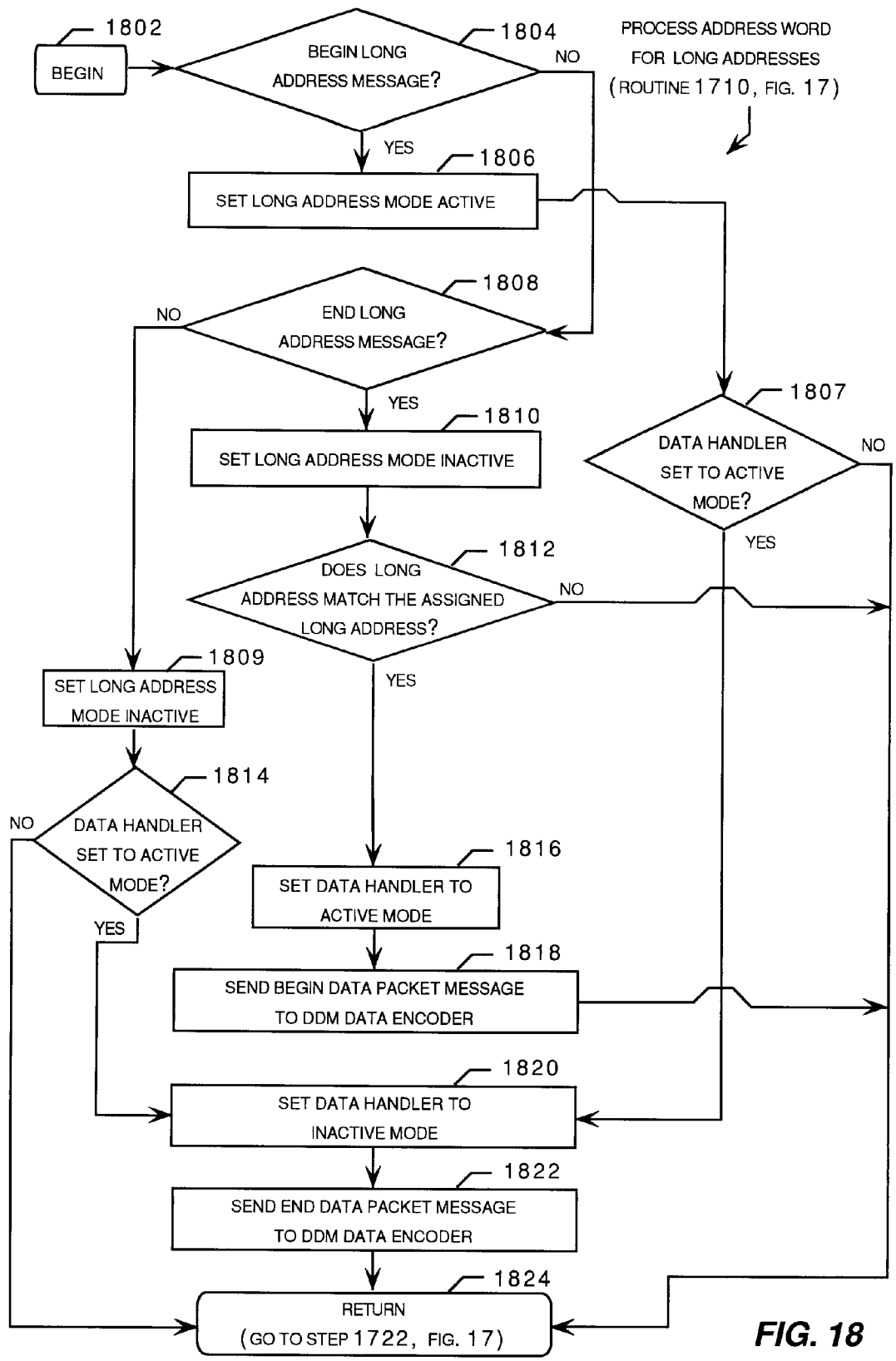
FIG. 18 is a logic flow diagram illustrating the processing of long addresses in the protocol handler of FIG. 17.

FIG. 18 is a logic flow diagram illustrating routine 1710 for processing long address words. Routine 1710 begins in step 1702 following the "YES" branch from step 1708, which is shown in FIG. 17. In step 1804, the data handler 89 determines whether the received content word is a begin long address message, preferably by determining whether the received content word is the short address (0FE) dedicated to this type of message. If the received content word is a begin long address message, the "YES" branch is followed to step 1806, in which the data handler 89 is set to the long address collection mode.

Step 1806 is followed by step 1807, in which the data handler 89 determines whether it is already in the data active mode. If the data handler 89 is already in the data active mode, the "YES" branch is followed to 1820, in which the data handler is set to the data inactive mode. Because this signals the end of a data packet, which means that device-specific control data for the data sink 97 will not follow immediately, the data handler 89 typically sends an "end data packet" message to its associated data sink 97 in step 1822. Step 1822 is followed by the "RETURN" step 1824, which returns to step 1722, shown in FIG. 17.

Referring again to step 1804, if the received content word is not a begin long address message, the "NO" branch is followed to step 1808, in which the data handler 89 determines whether the received content word is an end long address message, preferably by determining whether the received content word is the short address (0FF) dedicated to this type of message. If the received content word is not an end long address message, the "NO" branch is followed to step 1809, in which the data collection mode for the data handler 89 is inactivated. Step 1809 is followed by step 1814, in which the data handler 89 determines whether it is set to the data active mode. If the data handler 89 is set to the data active mode, the "YES" branch is followed to step 1820, in which the data handler is set to the data inactive mode. Because this signals the end of a data packet, which means that device-specific control data for the data sink 97 will not follow immediately, the data handler 89 typically sends an "end data packet" message to its associated data sink 97 in step 1822. Step 1822 is followed by the "RETURN" step 1824, which returns to step 1722, shown on FIG. 17.

Referring again to step 1808, if the received content word is an end long address message, the "YES" branch is followed to step 1810, in which the long address collection mode for data handler 89 is inactivated. In step 1812, the data handler 89 determines whether the received long address (i.e., the long address collected in step 1720, which is shown in FIG. 17) matches the long address assigned to its associated data sink 97. If the received long address matches the long address assigned to its associated data sink 97, the "YES" branch is followed to step 1816, in which data handler 89 is set to the data active mode. Because device-specific control data for the data sink 97 will follow immediately, the data handler 89 typically sends a "begin data packet" message to its associated data sink 97 in step 1818. Step 1818 is followed by the "RETURN" step 1824, which returns to step 1722, shown on FIG. 17.

Those skilled in the art will understand that the specific protocol illustrated in Tables 1–4 are just one example of many specific protocols that could be used to implement an addressing scheme using short addresses and long address in accordance with the present invention. In addition, the location of the data within the encoded video signal 104 may be varied somewhat without unduly affecting the performance of the system 100. In particular, Microsoft Corporation has been granted permission by the Federal Communications Commission to encode digital data in lines 23–257 in field-1 and lines 285–519 in field-2 of a standard 525 line NTSC television broadcast signal. As shown in FIG. 10B and Tables 1–4 above, the preferred protocol only utilizes lines 23–237 in field-1 and lines 286–500 in field-2. This enhances compatibility of the encoded video signal 104 with MPEG-based video compression algorithms, which typically exclude line 285 and include a compressed representation of only 480 visible scan lines.

The invention thus provides a method and system for encoding control data for wireless controlled devices in connection with a video signal so that the actions of the controlled devices operate in synchronism with the programming information defined by the video signal. Additional data may be transmitted encoded into the video signal for providing additional services, such as e-mail, foreign language subtitling, intercom capability, telephone pages, weather warnings, configuration data for a set-top box, and so forth. The protocol for the encoded data is addressable, forwardly compatible, error tolerant, and feasible to deploy in connection with a system that is primarily intended to be a children's entertainment product.

It should be understood that the foregoing relates only to specific embodiments of the invention, and that numerous changes may be made therein without departing from the spirit and scope of the invention as defined by the following claims.

What is claimed is:

1. A method for encoding control data in a video signal defining a plurality of frames, each frame comprising a plurality of lines, comprising the steps of:

concatenating encoded data with the lines of the video signal to create an encoded video signal, such that the encoded data are included within the plurality of frames that define the video signal, and are not concatenated with either of:

portions of the video signal corresponding to a vertical blanking interval, and portions of the video signal corresponding to a visible raster; and configuring the encoded data to define signal detection data comprising a plurality of data bits and content data in association with each frame, the content data comprising a plurality of content words, each content word comprising a plurality of data bits and a plurality of error correction bits defining a correction sequence that enables errors in the data bits to be detected and corrected, the content data defining:

a first address associated with a first device;

device-specific control data for the first device;

a second address associated with a second device; and device-specific control data for the second device.

2. The method of claim 1, further comprising the steps of:

in response to the first address, routing the specific control data for the first device to the first device;

controlling actions of the first device in accordance with the device-specific control data for the first device;

in response to the second address, routing the specific control data for the second device to the second device;

controlling actions of the second device in accordance with the device-specific control data for the second device.

3. The method of claim 2, wherein:

the video signal defines programming information comprising a scene displayed on a display device; and the device-specific control data for the first device includes voice data and motor control data that causes the first device to behave as a character in the scene displayed on the display device.

4. The method of claim 3, wherein the device-specific control data for the second device comprises at least one of the following:

voice data that cause the second device to behave as a second character in the scene displayed on the display device;

motor control data that cause the second device to behave as a second character in the scene displayed on the display device receiving the encoded video signal from the video data encoder;

electronic mail for a transmission to a computer system;

intercom information for transmission to an intercom system;

telephone paging information for transmission to a paging system;

language translation data displayed on the display device;

advertising information displayed on the display device;

subscription information displayed on the display device; and emergency warning information displayed on the display device.

5. The method of claim 4, wherein the first address comprises a first start-packet short address word and the second address comprises a second start-packet short address word, further comprising the step of:

interpreting the second start-packet short address as a first end-packet short address word for the first device.

6. The method of claim 4, wherein the first address comprises a start-packet begin-long-address word, further comprising the step of configuring the content data to define:

a first occurrence of a long address word associated with the first device;

a start-packet end-long-address word associated with the first device; and device-specific control data for the first device.

7. The method of claim 1, wherein the signal detection data comprises at least one signal detection word, each signal detection word comprising:

the plurality of data bits, and a plurality of error correction bits defining a correction sequence that allows a single-bit error in the data bits to be detected and corrected.

8. The method of claim 7, wherein:

the video signal comprises a plurality of two-field interlaced frames; and the encoded data of each field of the video signal defines a signal detection word consisting essentially of four data bits and three error correction bits.

9. The method of claim 1, wherein each content word consists essentially of nine data bits and seven error correction bits.

10. The method of claim 1, further comprising the step of:

configuring the encoded data to define signal detection data comprising a signal detection word encoded into each of a plurality of the frames of the video signal; and a consecutive series of signal detection words defines a dynamic validation sequence in which each signal detection word varies in at least two bits from the immediately preceding signal detection word.

11. The method of claim 10, wherein the dynamic validation sequence comprises the binary representation of 8, 1, 10, 3, 12, 5, 14, 7.

12. The method of claim 1, wherein:

the encoded data comprises a plurality of line signals; and each line signal is located in the horizontal overscan portion of one of the lines of the video signal.

13. The method of claim 12, wherein each line of the video signal comprises a color burst portion and a visible raster portion, and wherein each line signal comprises a pulse located between the color burst portion and the visible raster portion.

14. The method of claim 13, wherein each pulse defines a single bit of the encoded data.

15. The method of claim 14, wherein:

the video signal comprises a plurality of two-field interlaced frames; and the encoded data of each field of the video signal defines a 7-bit signal detection word and 13 16-bit content words.

16. The method of claim 13, wherein each pulse is modulated to define a plurality of bits of the encoded data.

17. The method of claim 12, wherein each line of the video signal comprises a color burst portion, a visible raster portion, and a horizontal blanking interval, and wherein each line signal comprises:

a pre-visible pulse located between the color burst portion and the visible raster portion; and a post-visible pulse located after the visible raster portion and before the horizontal blanking interval.

18. The method of claim 17, wherein:

each pre-visible pulse defines a single bit of the encoded data; and each post-visible pulse defines a single bit of the encoded data.

19. The method of claim 17, wherein:

each pre-visible pulse is modulated to define a plurality of bits of the encoded data; and each post-visible pulse is modulated to define a plurality of bits of the encoded data.

20. A storage medium including a computer program which, when executed by a computer-based video data encoder, causes the video data encoder to perform the steps of:

receiving a video signal defining a plurality of frames, each frame comprising a plurality of lines, the video signal defining programming information; and concatenating encoded data with a plurality of the lines of a plurality of the frames of the video signal to create an encoded video signal;

the encoded data defining content data in association with each frame;

the content data defining:

a first start-packet short address word associated with a first device, the first start-packet short address word comprising a plurality of bits, including at least one bit identifying the word as an address word, and a plurality of bits identifying the word as a start packet of a long address;

device-specific control data for causing the first device to behave as a character in a scene defined by the programming information;

a second start-packet short address word associated with a second device, the second start-packet short address word comprising a plurality of bits, including at least one bit identifying the word as an address word, and a plurality of bits identifying the word as a start packet of a long address; and device-specific control data for the second device; and transmitting the encoded video signal to a receiving device.

21. The storage medium of claim 20, wherein the content data further defines:

a start-packet start-long-address word associated with a third device;

a long address word associated with the third device;

a start-packet end-long-address word associated with the third device; and device-specific control data for the third device.

22. The storage medium of claim 20, wherein:

the encoded data defines signal detection data comprising a signal detection word encoded into each of a plurality of the frames of the video signal; and a consecutive series of the signal detection words defines a dynamic validation sequence in which each signal detection word varies in at least two bits from the immediately preceding signal detection word.

23. The storage medium of claim 20, wherein the encoded data comprises a plurality of line signals wherein each line signal is inserted in the horizontal overscan portion of a line of the video signal.

24. The storage medium of claim 20, wherein:

the content data comprises a plurality of content words and the signal detection data comprises a plurality of signal detection words, each signal detection word and each content word comprising;

a plurality of data bits, and a plurality of error correction bits defining a correction sequence that allows errors in the data bits to be detected and corrected.

25. A system for encoding data in association with a video signal, comprising a video data encoder functionally connected to a video source and operative for:

receiving a video signal from the video source, the video signal defining a plurality of frames, each frame comprising a plurality of lines, at least part of the video signal corresponding to a visible raster portion of the video signal comprising data used to generate a picture on a display;

concatenating encoded data with a plurality of the lines of a plurality of the frames of the video signal to create an encoded video signal, such that the encoded data are not concatenated with portions of the video signal corresponding to a vertical blanking interval;

the encoded data defining a signal detection word and at least one content word in association with each of a plurality of frames; and the content words defining:

a first start-packet short address word associated with a first device;

device-specific control data for the first device;

a second start-packet short address word associated with a second device; and device-specific control data for the second device.

26. The system of claim 25, wherein:

the video signal defines programming information; and the device-specific control data for the first device causes the first device to behave as a character in a scene defined by the programming information.

27. The system of claim 26, wherein the encoded data comprises a plurality of line signals wherein each line signal is located in the horizontal overscan portion of a line of the video signal.

28. The system of claim 27, wherein each line of the video signal comprises a color burst portion and a visible raster portion, and wherein each line signal comprises a pulse located between the color burst portion and the visible raster portion.

29. The system of claim 28, wherein each pulse defines a single bit of the encoded data.

30. The system of claim 29, wherein:

the video signal comprises a plurality of two-field interlaced frames; and the encoded data of each field of the video signal defines a signal detection word and thirteen content words.

31. The system of claim 30, wherein each pulse is modulated to define a plurality of bits of the encoded data.

32. The system of claim 30, wherein each line of the video signal comprises a color burst portion, a visible raster portion, and a horizontal blanking interval, and wherein each line signal comprises:

a pre-visible pulse located between the color burst portion and the visible raster portion; and a post-visible pulse located after the visible raster portion and before the horizontal blanking interval.

33. The system of claim 32, wherein:

each pre-visible pulse defines a single bit of the encoded data; and each post-visible pulse defines a single bit of the encoded data.

34. The system of claim 32, wherein:

each pre-visible pulse is modulated to define a plurality of bits of the encoded data; and each post-visible pulse is modulated to define a plurality of bits of the encoded data.

35. The system of claim 25, further comprising a data decoder functionally connected to the video data encoder and operative for:

receiving the encoded video signal from the video data encoder;

detecting the presence of the signal detection word;

extracting the content data from the encoded video signal; and assembling the content data into a serial data communication signal.

36. The system of claim 35, further comprising a data error processor functionally connected to the data decoder and operative for:

receiving the serial data communication signal from the data decoder;

parsing the serial data communication signal into data bits and error correction bits;

analyzing the error correction bits to detect errors in the data bits;

encoded video signal from the video data encoder;

correcting detected errors in the data bits; and assembling the corrected data bits into an error corrected data stream.

37. The system of claim 36, further comprising a protocol handler functionally connected to the data error processor and operative for:

receiving the corrected data stream;

detecting the first start-packet short address word associated with a first device;

in response to detecting the first start-packet short address word associated with the first device, beginning the routing of subsequently received device-specific control data to the first device;

detecting the second start end-packet short address word associated with the second device;

in response to detecting the second start end-packet short address word associated with the second device,
discontinuing the routing of subsequently received device-specific control data to the first device, and
beginning the routing of subsequently received device-specific control data to the second device.

38. The system of claim 37, wherein the protocol handler is further operative for:

detecting a start-packet start-long-address word;

detecting a first occurrence of a long address associated with a third device;

detecting a start-packet end-long-address word;

beginning the routing of subsequently received device-specific control data to the third device;

detecting a further address word; and in response to detecting the further address word, discontinuing the routing of subsequently received device-specific control data to the third device.

39. The system of claim 38, wherein the device-specific control data for the first, second and third devices are selected from the following:

voice data for transmission to a controlled device, the voice data configured to cause the controlled device to behave as a character in a scene defined by programming information defined by the video signal;

motor control data for transmission to a controlled device, the motor control data configured to cause the controlled device to behave as a second character in a scene defined by programming information defined by the video signal;

electronic mail for a transmission to a computer system;

intercom information for transmission to an intercom system;

telephone paging information for transmission to a paging system;

language translation data displayed on a display device;

advertising information displayed on a display device;

subscription information displayed on a display device; and emergency warning information displayed on a display device.

40. A method for encoding control data in a video signal defining a plurality of frames, each frame comprising a plurality of lines, comprising the steps of:

concatenating encoded data with the lines of the video signal to create an encoded video signal, such that the data is entirely encoded within the plurality of frames; and configuring the encoded data to define:
a signal detection word comprising a plurality of error correction bits defining a correction sequence that allows a single-bit error in the data bits to be detected and corrected; and
at least one content word in association with each frame, wherein content words define:
a first address associated with a first device, wherein the first device comprises a controller;
device-specific control data for the first device;
a second address associated with a second device, wherein the second device comprises a controlled device that does not display data from the video signal; and
device-specific control data for the second device.

41. A system for encoding data in association with a video signal, comprising a video data encoder functionally connected to a video source and operative for:

receiving a video signal from the video source, the video signal defining a plurality of frames, each frame comprising a plurality of lines;

concatenating encoded data with a plurality of the lines of a plurality of the frames of the video signal to create an encoded video signal;

the encoded data defining a signal detection word and at least one content word in association with each of a plurality of frames; and wherein content words define:

a first start-packet short address word associated with a first device, the first start-packet short address word comprising a plurality of bits, including at least one bit identifying the word as an address word, and a plurality of bits identifying the word as a start packet of a long address, wherein the first device comprises a controller;

device-specific control data for the first device;
a second start-packet short address word associated with a second device, the second start-packet short address word comprising a plurality of bits, including at least one bit identifying the word as an address word, and a plurality of bits identifying the word as a start packet of a long address, wherein the second device comprises a controlled device that does not display data from the video signal; and
device-specific control data for the second device.

42. A storage medium including a computer program which, when executed by a computer-based video data encoder, causes the video data encoder to perform the steps of:

receiving a video signal defining a plurality of frames, each frame comprising a plurality of lines, the video signal defining programming information; and concatenating encoded data with a plurality of the lines of a plurality of the frames of the video signal to create an encoded video signal, such that the encoded data is not concatenated with either of:
portions of the video signal corresponding to a vertical blanking interval; and
portions of the video signal corresponding to a visible raster;

the encoded data defining content data in association with each frame; and the content data defining:
a first start-packet short address word associated with a first device, the first start-packet short address word comprising a plurality of bits, including at least one bit identifying the word as an address word, and a plurality of bits identifying the word as a start packet of a long address;

device-specific control data for the first device;

a second start-packet short address word associated with a second device, the second start-packet short address word comprising a plurality of bits, including at least one bit identifying the word as an address word, and a plurality of bits identifying the word as a start packet of a long address; and device-specific control data for the second device.

43. A storage medium including a computer program which, when executed by a computer-based video data encoder, causes the video data encoder to perform the steps of:

receiving a video signal defining a plurality of frames, each frame comprising a plurality of lines, the video signal defining programming information;

concatenating encoded data with a plurality of the lines of a plurality of the frames of the video signal to create an encoded video signal;

the encoded data defining content data in association with each frame; and the content data defining:
  a first start-packet short address word associated with a first device, the first start-packet short address word comprising a plurality of bits, including at least one bit identifying the word as an address word, and a plurality of bits identifying the word as a start packet of a long address, wherein the first device comprises a controller;
  device-specific control data for the first device;
  a second start-packet short address word associated with a second device, the second start-packet short address word comprising a plurality of bits, including at least one bit identifying the word as an address word, and a plurality of bits identifying the word as a start packet of a long address, wherein the second device comprises a controlled device that does not display data from the video signal; and
  device-specific control data for the second device.

44. A method for encoding control data in a video signal defining a plurality of frames, each frame comprising a plurality of lines, comprising the steps of:

concatenating encoded data with the lines of the video signal to create an encoded video signal, such that the encoded data is entirely contained within the plurality of frames defining the video signal;

configuring the encoded data to define content data in association with each frame; and the content data defining:
  a first start-packet short address word associated with a first device, the first start-packet short address word comprising a plurality of bits, including at least one bit identifying the word as an address word, and a plurality of bits identifying the word as a start packet of a long address;
  device-specific control data for the first device;
  a second start-packet short address word associated with a second device, the second start-packet short address word comprising a plurality of bits, including at least one bit identifying the word as an address word, and a plurality of bits identifying the word as a start packet of a long address; and
  device-specific control data for the second device.

45. A storage medium that stores machine instructions comprising a computer program which, when executed by a processor-based video data encoder, causes the video data encoder to perform the steps of:

receiving a video signal defining a plurality of frames, each frame comprising a plurality of lines, the video signal defining programming information;

concatenating encoded data with a plurality of the lines of a plurality of the frames of the video signal to create an encoded video signal;

the encoded data defining both a signal detection word comprising a plurality of bits and at least one content word comprising a plurality of bits in association with each frame such that at least one of the signal detection word and the at least one content word further comprises a plurality of error correction bits defining a correction sequence that allows a single-bit error in the plurality of data bits to be detected and corrected; and wherein content words define:
  a first address associated with a first device;
  device-specific control data for the first device;
  a second address associated with a second device; and
  device-specific control data for the second device.

46. A method for encoding control data in a video signal defining a plurality of frames, each frame comprising a plurality of lines, comprising the steps of:

concatenating encoded data with the lines of the video signal to create an encoded video signal;

configuring the encoded data to define signal detection data and content data in association with each frame, such that a consecutive series of signal detection words defines a dynamic validation sequence in which each signal detection word varies in at least two bits from an immediately preceding signal detection word; and the content data defining:
  a first address associated with a first device;
  device-specific control data for the first device;
  a second address associated with a second device; and
  device-specific control data for the second device.

47. A storage medium for storing machine instructions comprising a computer program which, when executed by a processor-based video data encoder, causes the video data encoder to perform the steps of:

receiving a video signal defining a plurality of frames, each frame comprising a plurality of lines, the video signal defining programming information;

concatenating encoded data with a plurality of the lines of a plurality of the frames of the video signal to create an encoded video signal;

the encoded data defining both signal detection data and content data in association with each frame, such that a consecutive series of signal detection words defines a dynamic validation sequence in which each signal detection word varies in at least two bits from the immediately preceding signal detection word; and the content data defining:
  a first address associated with a first device;
  device-specific control data for the first device;
  a second address associated with a second device; and
  device-specific control data for the second device.

48. A method for encoding control data in a video signal defining a plurality of frames, each frame comprising a plurality of lines, comprising the steps of:

providing a video signal, the video signal defining a plurality of frames, each frame comprising a plurality of lines, at least part of the video signal corresponding to a visible raster portion of the video signal comprising data used to generate a picture on a display;

concatenating encoded data with the lines of the video signal to create an encoded video signal, such that the encoded data are not concatenated with portions of the video signal corresponding to a vertical blanking interval;

configuring the encoded data to define both signal detection data and content data in association with each frame, and the content data defining:
- a first start-packet short address word associated with a first device, the first start-packet short address word comprising a plurality of bits, including at least one bit identifying the word as an address word, and a plurality of bits identifying the word as a start packet of a long address;
- device-specific control data for the first device;
- a second start-packet short address word associated with a second device, the second start-packet short address word comprising a plurality of bits, including at least one bit identifying the word as an address word, and a plurality of bits identifying the word as a start packet of a long address; and
- device-specific control data for the second device.

49. A method for encoding control data in a video signal defining a plurality of frames, each frame comprising a plurality of lines, comprising the steps of:

concatenating encoded data with the lines of the video signal to create an encoded video signal, such that the encoded data are included within the plurality of frames that define the video signal, and are not concatenated with either of:
- portions of the video signal corresponding to a vertical blanking interval; and
- portions of the video signal corresponding to a visible raster; and configuring the encoded data to define signal detection data comprising a plurality of data bits and content data in association with each frame, the content data defining:
- a first address associated with a first device, the first address comprising a first start-packet short address word;
- device-specific control data for the first device;
- a second address associated with a second device, the second address comprising a second start-packet short address word; and
- device-specific control data for the second device; and interpreting the second start-packet short address as a first end-packet short address word for the first device.

50. A method for encoding control data in a video signal defining a plurality of frames, each frame comprising a plurality of lines, comprising the steps of:

concatenating encoded data with the lines of the video signal to create an encoded video signal, such that the encoded data are included within the plurality of frames that define the video signal and are not concatenated with either of:
- portions of the video signal corresponding to a vertical blanking interval; and
- portions of the video signal corresponding to a visible raster; and configuring the encoded data to define signal detection data comprising a plurality of data bits and content data in association with each frame, the content data defining:
- a first address associated with a first device, the first address comprising a start-packet begin-long-address word;
- a first occurrence of a long address word associated with the first device;
- a start-packet end-long-address word associated with the first device;
- device-specific control data for the first device;
- a second address associated with a second device; and
- device-specific control data for the second device.

51. A method for encoding control data in a video signal defining a plurality of frames, each frame comprising a plurality of lines, comprising the steps of:

concatenating encoded data with the lines of the video signal to create an encoded video signal, such that the encoded data are included within the plurality of frames that define the video signal and are not concatenated with either of:
- portions of the video signal corresponding to a vertical blanking interval; and
- portions of the video signal corresponding to a visible raster; and configuring the encoded data to define:
- signal detection data comprising at least one signal detection word, each signal detection word comprising a plurality of data bits and a plurality of error correction bits defining a correction sequence that enable a single-bit error in the data bits to be detected and corrected; and content data in association with each frame, the content data defining:
- a first address associated with a first device;
- device-specific control data for the first device;
- a second address associated with a second device; and
- device-specific control data for the second device.

* * * * *